(12) United States Patent
Sherwood et al.

(10) Patent No.: US 11,868,776 B2
(45) Date of Patent: *Jan. 9, 2024

(54) AI SYNAPTIC COPROCESSOR

(71) Applicant: COGNITIVE SCIENCE & SOLUTIONS, INC., Dover, DE (US)

(72) Inventors: David Sherwood, Marriottsville, MD (US); Terry A. Higbee, Conifer, CO (US)

(73) Assignee: COGNITIVE SCIENCE & SOLUTIONS, INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,597

(22) Filed: Feb. 14, 2023

(65) Prior Publication Data
US 2023/0205529 A1    Jun. 29, 2023

Related U.S. Application Data

(63) Continuation of application No. 17/242,374, filed on Apr. 28, 2021, now Pat. No. 11,599,360.
(Continued)

(51) Int. Cl.
*G06F 7/02*  (2006.01)
*G06F 9/30*  (2018.01)
(Continued)

(52) U.S. Cl.
CPC ............ *G06F 9/30152* (2013.01); *G06F 7/57* (2013.01); *G06F 13/28* (2013.01); *G06N 3/063* (2013.01)

(58) Field of Classification Search
CPC ........ G06F 9/30152; G06F 7/57; G06F 13/28; G06N 3/063
See application file for complete search history.

(56) References Cited

U.S. PATENT DOCUMENTS 3,962,685 A * 6/1976 Belle Isle ................. G06F 9/38
                                                        712/247
5,359,697 A   10/1994 Smith et al.
(Continued)

OTHER PUBLICATIONS

Bytyn et al., "An Application-Specific VLIW Processor with Vector Instruction Set for CNN Acceleration," 2019 IEEE International Symposium on Circuits and Systems (ISCAS); May 26-29, 2019; 6 pages. See Priority U.S. Appl. No. 17/242,374, filed Apr. 28, 2021.
(Continued)

*Primary Examiner* — Cheng Yuan Tseng
(74) *Attorney, Agent, or Firm* — ALLEN, DYER, DOPPELT + GILCHRIST, P.A.

(57) ABSTRACT

A coprocessor may include a memory configured to store a plurality of Very Long Data Words, each as a test Very Long Data Word (VLDW) having a length in the range of about one thousand bits to one million or more bits and containing encoded information that is distributed across the length of the VLDW. A processor generates search terms and a processing logic unit receives a test VLDW from the memory, receives a search term from the processor, and computes a Boolean inner product between the search term and the test VLDW read from memory indicative of the measure of similarity between the test VLDW and the search term. Optionally, buffers within logic circuits of processing pipelines may receive the test VLDWs.

20 Claims, 22 Drawing Sheets

Related U.S. Application Data

(60) Provisional application No. 63/124,923, filed on Dec. 14, 2020.

(51) Int. Cl.
  *G06F 7/57* (2006.01)
  *G06F 13/28* (2006.01)
  *G06N 3/063* (2023.01)

(56) References Cited

U.S. PATENT DOCUMENTS

| | | | | |
|---|---|---|---|---|
| 7,129,954 | B2* | 10/2006 | Sekine | G06T 11/001 345/589 |
| 8,429,153 | B2* | 4/2013 | Birdwell | G06F 18/2323 707/723 |
| 8,601,244 | B2 | 12/2013 | Egger et al. | |
| 9,971,965 | B2* | 5/2018 | Amir | G06N 3/08 |
| 10,255,323 | B1* | 4/2019 | Guo | G06F 16/24561 |
| 10,303,717 | B2* | 5/2019 | Ishii | G06F 16/583 |
| 10,489,468 | B2* | 11/2019 | Lytkin | G06F 16/951 |
| 10,963,738 | B2* | 3/2021 | Geraci | G06F 18/24 |
| 11,023,477 | B2* | 6/2021 | Fan | H04L 9/0894 |
| 11,218,695 | B2* | 1/2022 | Park | H04N 19/65 |
| 11,328,733 | B2* | 5/2022 | Mosayyebpour Kaskari | G06N 3/084 |
| 11,392,596 | B2* | 7/2022 | Wu | G06F 16/24542 |
| 11,409,752 | B1 | 8/2022 | Qadrud-Din et al. | |
| 11,599,360 | B2* | 3/2023 | Sherwood | G06F 9/3001 |
| 11,704,312 | B2* | 7/2023 | Pasternack | G06F 16/24534 707/765 |
| 11,704,714 | B2* | 7/2023 | Hiranandani | G06N 3/08 705/26.62 |
| 2015/0324688 | A1* | 11/2015 | Wierzynski | G06N 3/045 706/20 |
| 2019/0065913 | A1* | 2/2019 | Kidera | G06V 10/82 |
| 2019/0122119 | A1 | 4/2019 | Husain | |
| 2019/0205741 | A1 | 7/2019 | Gupta et al. | |
| 2020/0167654 | A1 | 5/2020 | Guo et al. | |
| 2021/0374353 | A1* | 12/2021 | Zhang | G06F 40/30 |
| 2022/0188116 | A1* | 6/2022 | Sherwood | G06F 13/28 |
| 2022/0414445 | A1* | 12/2022 | Rasch | G06N 3/04 |
| 2023/0205529 | A1* | 6/2023 | Sherwood | G06F 9/30036 712/24 |

OTHER PUBLICATIONS

Hu et al., "Dot-Product Engine for Neuromorphic Computing: Programming 1T1M Crossbar to Accelerate Matrix-Vector Multiplication," Hewlett Packard Labs; HPE-2016-23; Hewlett Packard Enterprises; Mar. 3, 2016; pp. 1-7. See Priority U.S. Appl. No. 17/242,374, filed Apr. 28, 2021.

* cited by examiner

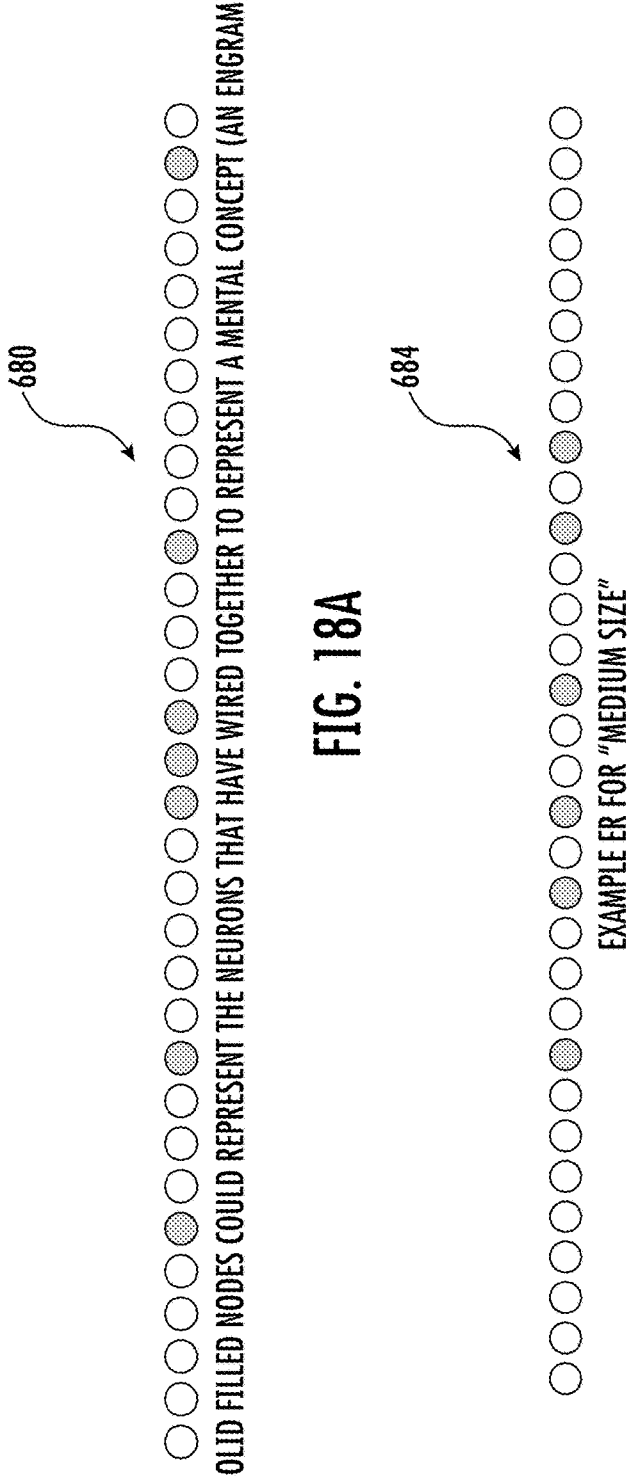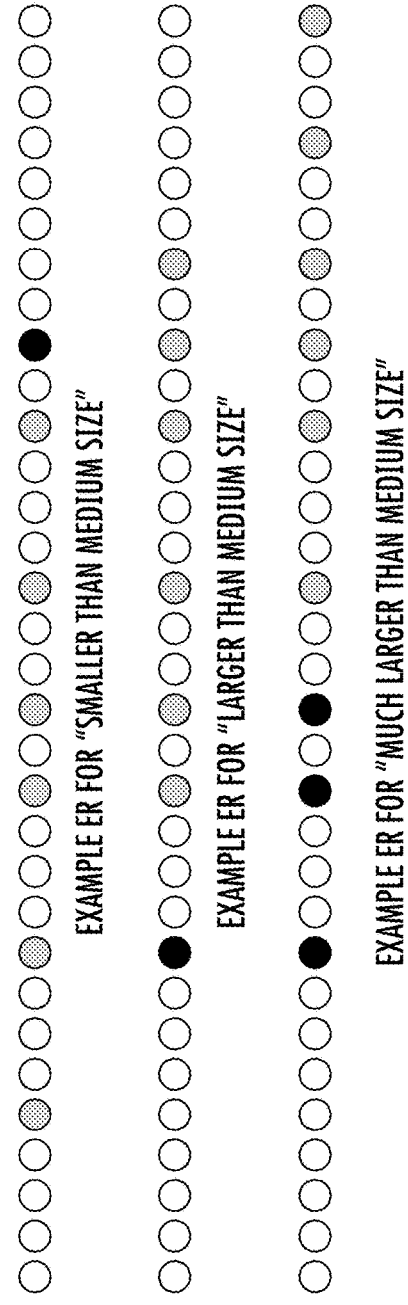
FIG. 18A
FIG. 18B

AI SYNAPTIC COPROCESSOR

PRIORITY APPLICATION(S)

This is a continuation application based upon U.S. patent application Ser. No. 17/242,374 filed Apr. 28, 2021, which is based upon U.S. provisional patent application Ser. No. 63/124,923, filed Dec. 14, 2020, the disclosures which are hereby incorporated by reference in their entirety.

FIELD OF THE INVENTION

The present invention relates to the field of computers, and more particularly, this invention relates to coprocessors used with computers, such as for artificial intelligence applications.

BACKGROUND OF THE INVENTION

Artificial intelligence applied to many computer applications has grown in recent years and placed demands on the computational power of normal processors. For example, processor speeds have almost reached a maximum at about 4 GHz, ending the gains that have been reached through increased clock speeds as transistor dimensions shrink based upon Moore's law. As semiconductor technology advances and gate lengths decrease, greater numbers of gates are placed on one chip, often more than 10 billion gates per chip. It is becoming increasingly difficult to place even greater numbers of gates on chips. One approach is to place more processors on each chip, but this requires partitioning the processing workload, synchronizing the tasks, and feeding the input and output to all processors.

Despite the growing limitations associated with Moore's law, computationally intensive artificial intelligence (AI) applications have exploded in capabilities in the last few years, and it is necessary to exceed the computing limitations of traditional Von Neumann style central processing units (CPU's). New hardware developments have been specifically designed for artificial intelligence applications to accelerate training and performance of neural networks and reduce power consumption. The traditional solution was to reduce the size of logic gates to fit more transistors. Shrinking logic gates below about 5 nanometers (nm), however, may cause the chip to malfunction because of quantum tunneling.

New artificial intelligence hardware includes processors that enable faster processing of these AI applications with enhanced machine learning, neural networks and computer vision. Some graphic processing units (GPU's) use massively parallel architecture with thousands of smaller, more efficient processing cores to handle multiple tasks simultaneously, instead of using a few cores optimized for sequential serial processing as in the more conventional central processing units available on the market. Other techniques for increasing process capabilities for AI include application-specific integrated circuits (ASIC), but these specialized hardware circuits suffer the drawback of implementing traditional Von Neumann architecture and floating point operations, even though there have been some improvements with a neural net architecture.

A field programmable gate array (FPGA), on the other hand, may enable greater customization after manufacturing using a hardware description language, and may include the application of neural networks to analyze large amounts of data. The use of programmable circuitry in a FPGA rather than customary software instructions enables complex neural nets to be configured and reconfigured seamlessly for deep data uses. These FPGA systems, however, have limited memory and slower clock rates.

Other possibilities to meet the increasing demands of artificial intelligence applications include quantum computers, which work significantly different than conventional computers. Instead of employing conventional "on" and "off" switches and bits depending on the electrical state, quantum computers use qubits, in which an individual bit can be in one of three states, i.e., on, off, or uniquely both on and off simultaneously. Instructions do not load sequentially, but may execute simultaneously, thus increasing speed dramatically. Advances in quantum computing are limited and it is difficult to access many items in a database at the same time and analyze different images or data points until further advancements are made in this technology area.

Although some advanced computer systems increase processing speed dramatically, these computer systems do not mimic the human mind, and instead use traditional floating point operations. Central processing units operate in a sequential manner, and even the more advanced graphic processing units operate via massive parallel processing. It is still linear processing, but the human mind is highly non-linear. The human brain has many billions of neurons and may each have up to 10,000 connections to other nerve cells, and externally and internally host hundreds of thousands of coordinated parallel processes that are mediated by millions of protein and nucleic acid molecular interactions. The complexity of the human brain is staggering. Many millions of neurons are employed at the same time with little power demand as compared to electronic circuits. Some of the more advanced chips may mimic the brain's architecture, but these use vastly greater amounts of power with a magnitude fewer computational connections. Even advanced neuromorphic chips that have recently been designed are limited in the number of artificial neurons that are used because of their design limitations and manufacturing tolerances.

Some very long instruction word computer architectures take advantage of instruction level parallelism, where a fixed number of operations are formatted as one large instruction in a massively parallel architecture. The processors may reduce hardware complexity, and a compiler may create each very long instruction word, but the design limitations associated with normal processors still applies.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

The coprocessor as disclosed provides enormously increased processing power without partitioning the processing load and may be used for artificial intelligence applications, including artificial general intelligence (AGI). The coprocessor expands the processing workload into very long data words having a range of about one thousand to one million or more bits, which are referred to as elastic representation VLDWs and are designed for knowledge representation in applications such as artificial intelligence and next generation databases.

The coprocessor may comprise a memory configured to store a plurality of Very Long Data Words, each comprising a test Very Long Data Word (VLDW) having a length in the range of about one thousand bits to one million or more bits and containing encoded information that is distributed across the length of the VLDW. A processor may be configured to generate search terms. A processing logic unit may be configured to receive a test VLDW from the memory, receive a search term from the processor, and compute a Boolean inner product between the search term and the test VLDW read from memory indicative of the measure of similarity between the test VLDW and the search term. The processing logic unit may operate on successive test VLDWs compared against a search term. An external sensor may be connected to the coprocessor and configured to generate sensor data, and the processor is configured to receive the sensor data and generate a sensed data VLDW from the sensor data. The processing logic unit is configured to compare the sensed data VLDW to a search term.

A buffer may be configured to store the Boolean inner products resulting from the computation between each search term and the test VLDW together with the address in memory from which the test VLDW was read. The processor may be configured to compare the Boolean inner products to a threshold and allow only those Boolean inner products that are greater than the threshold to pass to the buffer for storage therein. The processor may be configured to periodically scan through the buffer to determine match results among the Boolean inner products A search term may comprise a VLDW, and in another example, a search term may comprise a focused search term that is modified from an original search term as a VLDW to express or extinguish features of interest. The processing logic unit may comprise one or more pipelined Boolean logic circuits that compute the Boolean inner product. The one or more pipelined Boolean logic circuits may comprise a plurality of Boolean adder circuits. The processing logic unit may comprise a plurality of pipeline Boolean logic circuits configured in parallel to each other, and each pipelined Boolean logic circuit may be loaded with the same test VLDW and a different search term.

In yet another example, a Direct Memory Access (DMA) controller may be connected to the processor and memory and configured to address and control the transfer of test VLDWs from memory to the processing logic unit. The processor may include a conventional CPU interface for communicating with external devices, wherein the processor is configured to receive very long data words as a plurality of 64-bit words via the conventional CPU interface and reformat the 64-bit words into a test VLDW having a length of about one thousand bits to at least one million bits. The processor may be configured to perform calculations at a single clock rate and compute a Boolean inner product between each search term and the test VLDW at a latency to obtain the results after multiple clocks. In yet another example, the processor includes a serial interface and digital logic. The serial interface may pass serial data to the digital logic to reformat the serial data into very long data words.

The processor may be configured to generate a plurality of test VLDWs, and the processing logic unit may include a processing buffer into which the plurality of test VLDWs are buffered. The processing logic unit may comprise a plurality of pipeline Boolean logic circuits, and each having a processing buffer into which a plurality of test VLDWs are buffered.

In yet another example, a coprocessor may comprise a processor configured to generate 1) a plurality of Very Long Data Words, each comprising a test Very Long Data Word (VLDW) having a length in the range of about one thousand bits to one million or more bits and containing encoded information that is distributed across the length of the VLDW, and 2) search terms. A processing logic unit may be coupled to the processor and include a processing buffer and configured to receive a test VLDW from the processor and buffer the test VLDW within the processing buffer, receive a search term from the processor, and compute a Boolean inner product between the search term and the test VLDW indicative of the measure of similarity between the test VLDW and the search term.

The processing logic unit may comprise a plurality of pipeline Boolean logic circuits, each having a processing buffer into which a plurality of test VLDWs are buffered. A memory may be configured to store a plurality of test VLDWs, and the processing logic unit is configured to receive test VLDWs from the memory. A Direct Memory Access (DMA) controller may be connected to the processor and memory and configured to address and control the transfer of test VLDWs from memory to the processing logic unit. The processing logic unit may comprise a first plurality of pipeline Boolean logic circuits and each having a processing buffer into which a plurality of test VLDWs are buffered, and a second plurality of pipeline Boolean logic circuits and each configured to receive a test VLDW from the memory. A storage buffer may be configured to store the Boolean inner products resulting from the computation between each search term and the test VLDW together with the address from which the test VLDW was read.

BRIEF DESCRIPTION OF THE DRAWINGS

Other objects, features and advantages of the present invention will become apparent from the Detailed Description of the invention which follows, when considered in light of the accompanying drawings in which:

FIG. 18A is a schematic diagram of an engram as an individual neuron for an example elastic representation VLDW used with the synaptic coprocessor.

FIG. 18B are example elastic representation VLDWs similar to that of FIG. 18A to convey the size of an animal as used with the synaptic coprocessor.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
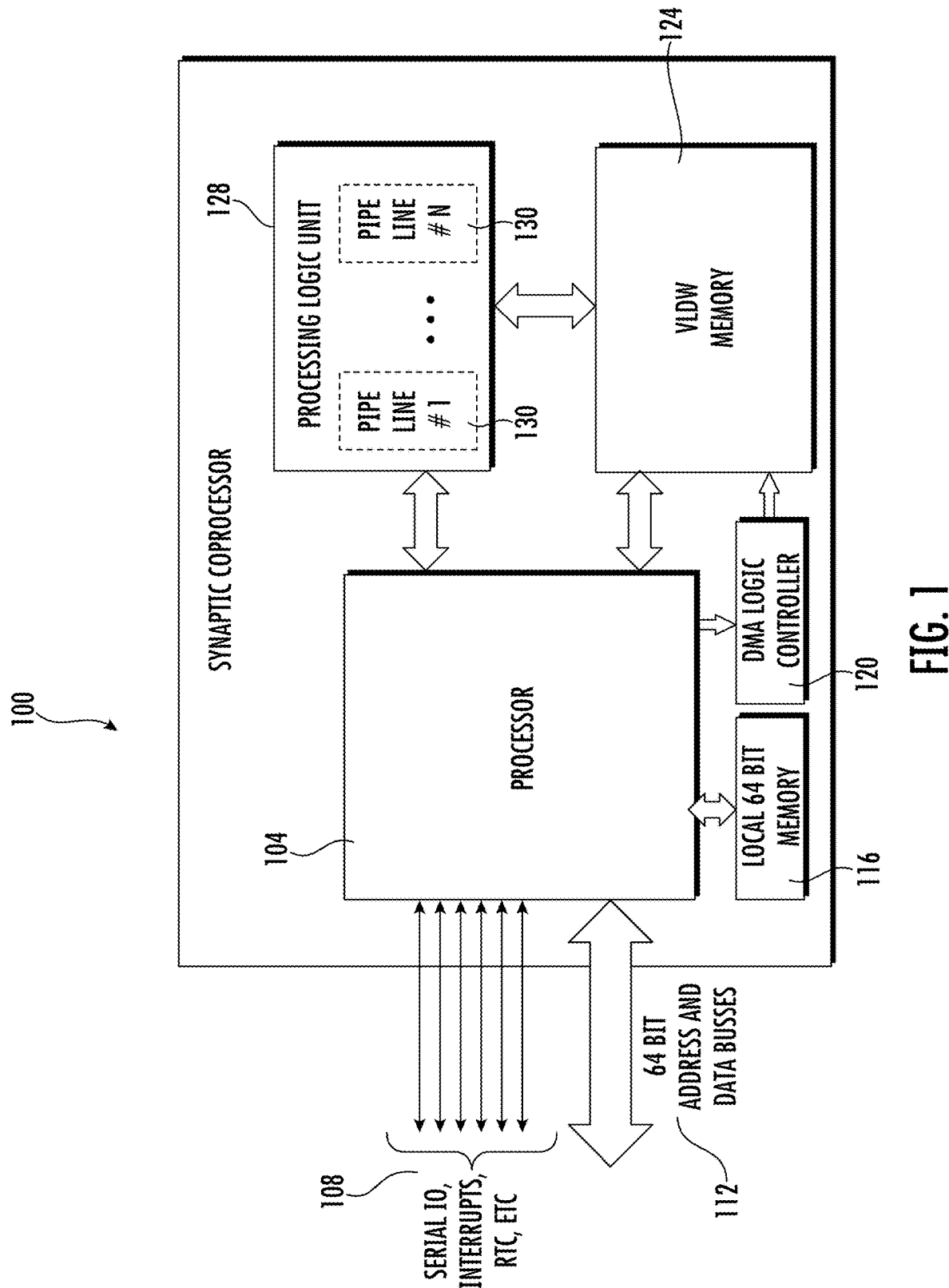
FIG. 1 is a block diagram of the synaptic coprocessor showing basic components in accordance with a non-limiting example.

Referring now to FIG. 1, there is illustrated at 100 the synaptic coprocessor that includes a processor 104 that communicates with external devices outside the synaptic coprocessor via a serial input and output port 108, and may receive and send interrupts and real-time clock signals. The synaptic coprocessor 100 includes 64-bit address and data buses 112 that communicate with other devices outside the synaptic coprocessor. A local 64-bit memory 116 is included within the synaptic coprocessor 100 that stores conventional length data. DMA logic 120 that may include DMA controller functionality may be connected to the processor 104 and to a very long data word (VLDW) memory 124 in this example. In another aspect described below with reference to FIG. 11B, a buffer may be used. The DMA controller 120 is configured to address and control the transfer of test very long data words (VLDWs) from the very long data word memory 124 to the processing logic unit 128, which includes a plurality of processing pipelines 130 as illustrated by Pipeline No. 1 to Pipeline No. N. The very long data word memory 124 is configured to store a plurality of very long data words, each formed as a test very long data word (VLDW) having a length in the range of about 1,000 bits to 1 million or more bits and containing encoded information that is distributed across the length of the VLDW. The number and range of bits may vary. The VLDW memory 124 may include RAM. The very long data words are also referred to as Elastic Representation VLDWs and designed for knowledge representation in applications such as artificial intelligence and next generation databases as explained in greater detail below. The illustrated processor 104, processing logic unit 128, and memory 124 may contain registers for holding data, such as conventional length, e.g., 64-bit words, or very long data words as described above.

Figure 2:
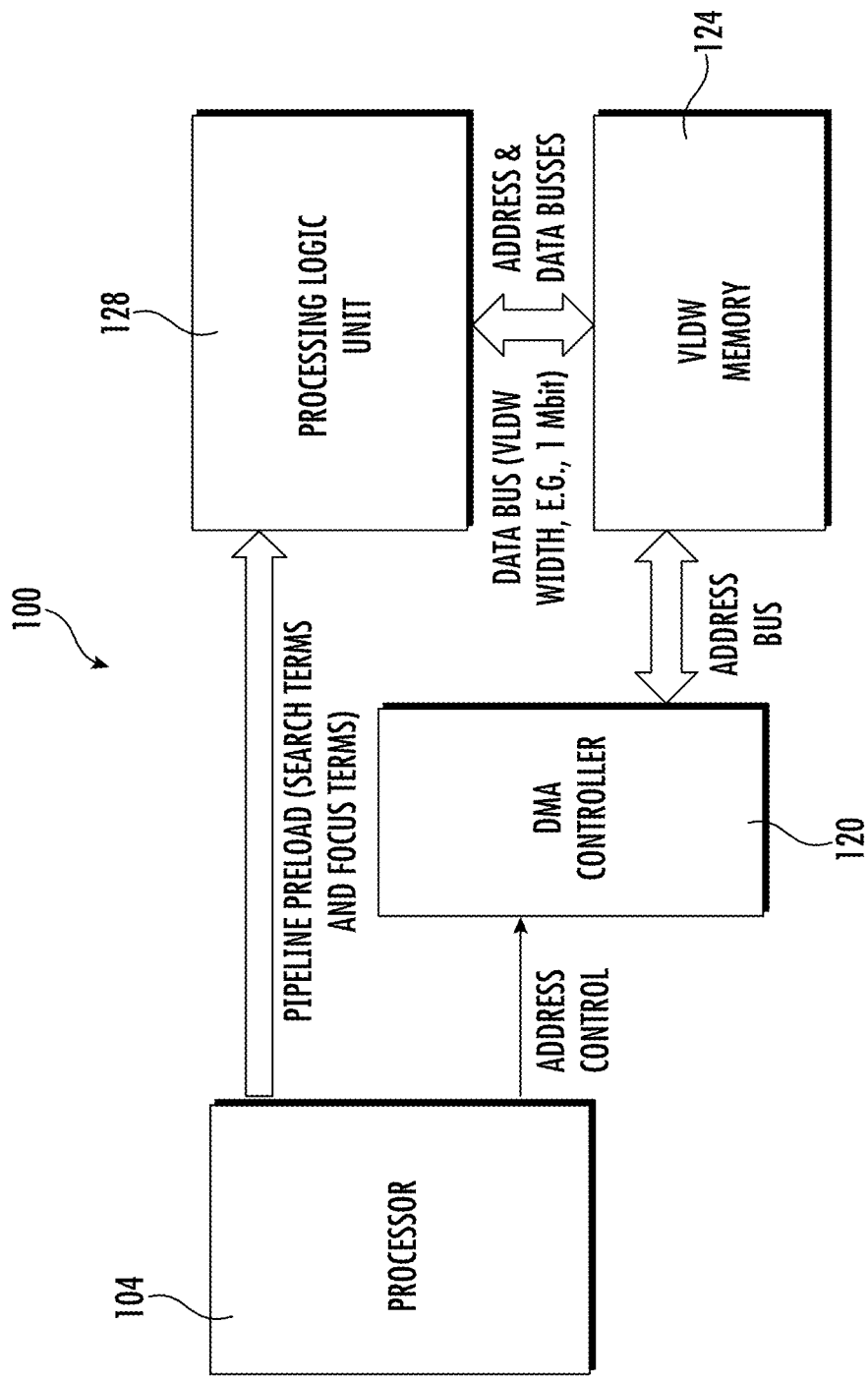
FIG. 2 is a block diagram of the synaptic coprocessor of FIG. 1 showing a single processing pipeline as an example data transport among components.

The processor 104 is configured to generate search terms and the processing logic unit 128 is configured to receive a test VLDW from the VLDW memory 124 and receive a search term that had been generated from the processor and compute a Boolean inner product between the search term and the test VLDW read from memory 124 indicative of the measure of similarity between the test VLDW and at least one search term (FIG. 2). The very long data word may include encoded information that is distributed across the length of the very long data word as a pseudorandom number, and in an example, include a globally random and locally ordered linear array of data. The search term may be a VLDW, and in an example, by processing in an attention processing unit 134 (FIG. 3), and which is part of the processing logic unit 128, may be converted into a focused search term that is modified from an original search term as a VLDW to express or extinguish features of interest as explained below. In an example, the processing logic unit 128 may be configured to operate on successive test VLDWs compared against a search term. In an example, the attention processing unit 134 is operative with a vector processing unit 138, which includes a scoring logic unit 142.

As shown in FIG. 2, the pipeline preload of data from the processor 104 may include search terms and focus terms. The focus terms, i.e., the attention data word (FIG. 3), modifies the search term as the target data word to form the focused search term as the focused target word. The processor 104 generates address control instructions to the DMA controller 120 in this example, which controls memory addressing instructions over the address bus to the VLDW memory 124, such as an address range of a certain test VLDW. The measure of similarity of the search term and the very long data word at the processing logic unit 128 is a count of the number of positions in which both the search term, which may be a very long data word, and the test very long data word read from the VLDW memory 124 have a "one." The count may be implemented by an adder tree organized as a processing pipeline 130 that can be clocked at the DMA rate. Due to the encoding that is used for the VLDW and the search term, there is no ripple, carry, or look ahead logic required, except with the adder tree in this example, which may be organized in stages to support the DMA clock rate. The data fields in a very long data word may be one bit wide in an example.

The processing logic unit 128 includes N processing pipelines 130, each formed as a pipeline Boolean logic circuit and corresponding to the illustrated Pipeline No. 1 to Pipeline No. N (FIG. 1) that compute the Boolean inner product. In one example, at least one of the pipeline Boolean logic circuits includes a Boolean adder circuit, and in another example, a plurality of pipeline Boolean logic circuits 130 may be configured in parallel to each other and each pipeline Boolean logic circuit loaded with the same test very long data word, but a different search term.

The synaptic coprocessor 100 via its processing logic unit 128 may be configured to perform calculations at a clock rate and compute a Boolean inner product between the search term and the test VLDW at a latency to obtain the results after multiple clocks. The conventional CPU interface as part of the 64-bit address and data buses 112 may communicate with external devices and the processor 104 and may be configured to receive a plurality of 64-bit words via the conventional CPU interface 112 and reformat the 64-bit words into a test VLDW having a length of anywhere from more than 1000 bits to 1 million or more bits. Although 64-bit words may be standard in some instances, other conventional length bit data words may be received and that data reformatted into a very long data word. The processor 104 may also include a serial interface 108 and associated digital logic. The serial interface 108 as part of a conventional CPU interface may pass serial data to the digital logic as part of the processor 104 to reformat the serial data into very long data words.

During processing, the result as sum logic from the processing logic unit 128 with its Boolean logic is a measure of the similarity of the search term and the test VLDW and may be buffered (FIG. 4) in a first-in first-out (FIFO) buffer 150, allowing access to the results of the processing. The buffer 150 may include buffering logic having controls that can be used to reduce the number of results that a central processing unit as part of the processor 104 may read.

As noted before, the processing logic unit 128 may include an attention processing unit 134, also referred to as attention logic, that provides the ability to modify the "search" term as an example very long data word (VLDW) to express only features or bits of interest or to exclude features that are not of interest and produce a focused search term that is then processed in another section of the processing logic unit as the vector processing unit 138 that includes the scoring logic 142 (FIG. 3) and operating on example one-dimensional arrays, such as a VLDW.

The search term and focus term may be preloaded within a pipelined preload circuit and the DMA controller 120 may begin to rapidly cycle through the very long data words stored in memory 124. A single processing pipeline 130 may include the attention logic circuit, such as the illustrated attention processing unit 134, and additionally processing logic, such as the vector processing unit 138, and a buffer circuit with associated logic that may include the FIFO buffer 150 shown in FIG. 4, which may operate as a storage buffer. Multiple processing pipelines 130 may operate in parallel where each processing pipeline may be preloaded with different search terms or focus terms and all pipelines may process the same very long data words from memory 124.

The processor 104 may also generate control signals to select a mode, such as in selecting the Boolean logic operation that may include AND, OR, EXOR, NAND, Left Circular Shift, or Right Circular Shift. The focused search term that results from the attention processing unit 134 may be vector processed 138 and the address and result sent back to the processor 104, including the Boolean inner product, which in this example had been buffered, along with the memory address from which the VLDW was retrieved from the VLDW memory 124. The processor 104 may periodically scan through the buffer 150 and inspect the matched results. To reduce the load on the processor 104, the Boolean inner products may be compared to a threshold, and those Boolean inner products that are greater than the threshold may pass to the buffer 150 for storage therein. The processor 104 may inform the DMA controller 120 as to the start and end address for blocks of VLDW memory 124 to be searched. The processor 104 is free to perform other functions while the DMA controller 120 drives the search and addresses operations for the different terms. At the conclusion of that processing function, the processor 104 may inspect the storage buffer 150 looking for the results of interest.

Using the conventional processor interface 112, in an example, a 64 kilobit very long data word may be processed at the processor 104 via data received over the standard conventional processor interface as 1,024 64 (sixty-four) bit words, and stored in the VLDW memory 124 as one 64 kilobit word. Within the synaptic coprocessor 100, the very long data words may be transported between VLDW memory 124 and the processing logic unit 128 as single very long data words with massively parallel processing as shown by the plurality of processing pipelines 130 (FIGS. 1 and 5), with control signals generated from the processor 104 to the various processing pipelines (FIG. 5) and the address and results buffered within the buffer 150 (not shown in FIG. 5) and sent back to the processor 104. Very long data words may be loaded into the different processing pipelines 130 of the processing logic unit 128 as search terms or focus terms (FIG. 2) and very long data words loaded from VLDW memory 124. It may be possible to load a series of 64-bit words from the processor 104 and the local 64-bit memory 116 (FIG. 1) and organized as 64-bit words. The synaptic coprocessor 100 has this adaptability for processing and generating those words having different word lengths.

Figure 3:
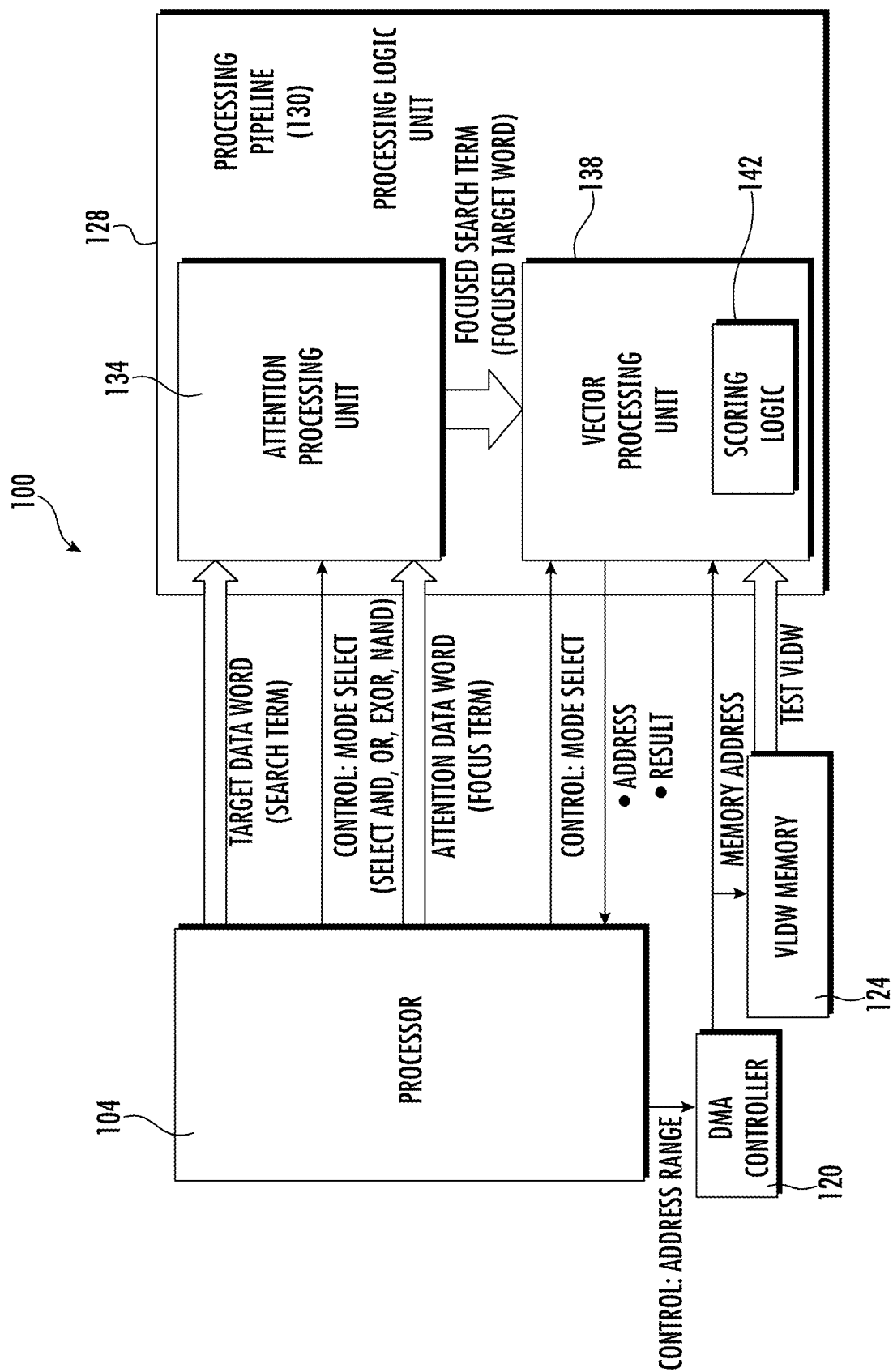
FIG. 3 is another block diagram of the synaptic coprocessor showing an example of the processing pipeline architecture.

As shown in FIG. 3, the processing logic unit 128 includes the attention processing unit 134 that receives a focus term, also referred to as an attention data word, and may be loaded with a very long data word that allows any associated search term (target data word) to be modified to express or extinguish specific features of interest. The various functions of AND, NAND, OR, NOR, EXOR, Left Circular Shift, and Right Circular Shift may apply individually or collectively to each of the processing pipelines 130. Each processing pipeline 130 may be loaded with a different focus term and loaded with a different search term. Each processing pipeline 130 may be set to perform a different Boolean operation via a control signal generated to a specific processing pipeline 130 from the processor 104 to select the mode for the Boolean calculation as shown in FIG. 3.

Figure 4:
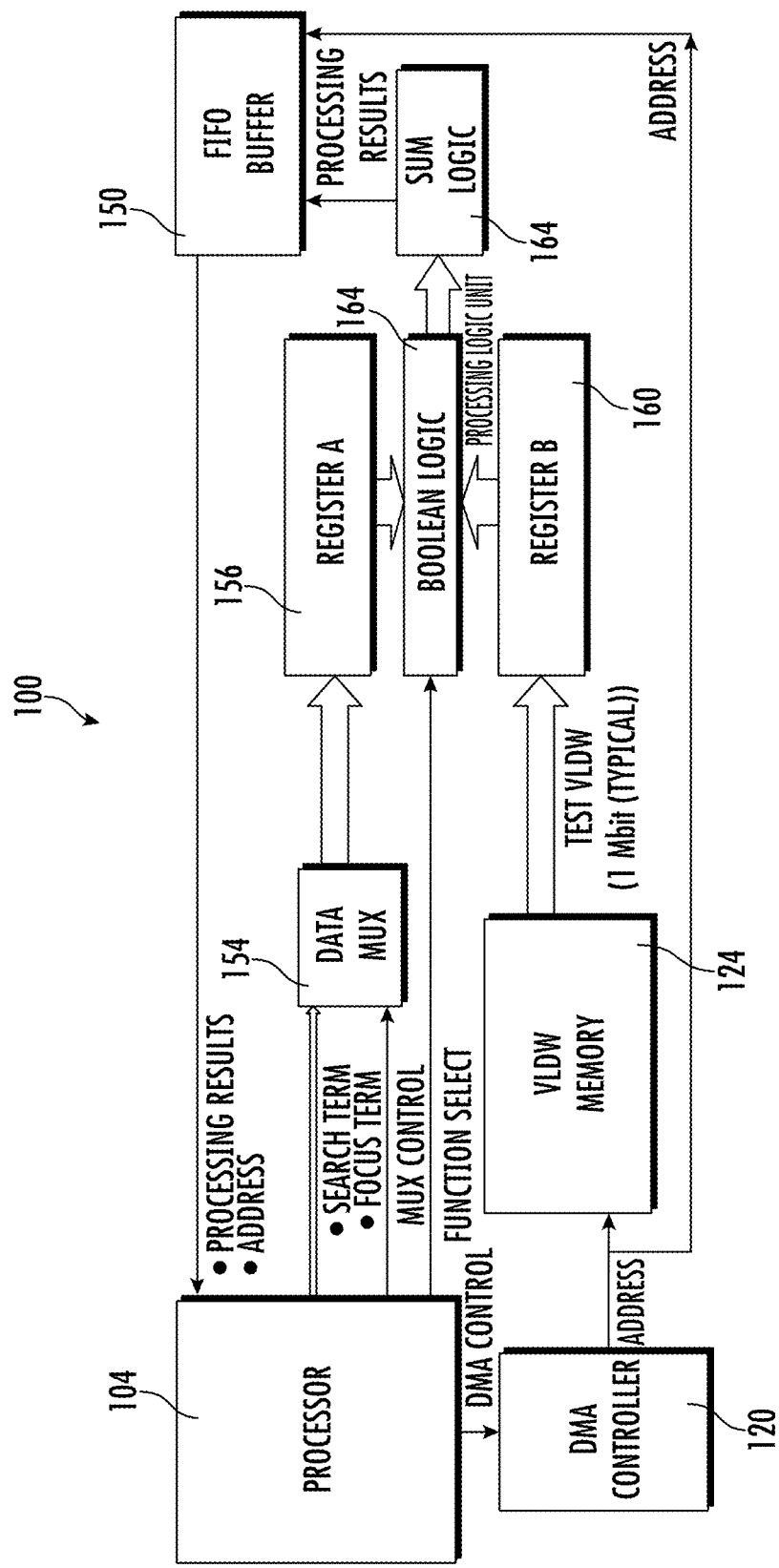
FIG. 4 is another block diagram of the synaptic coprocessor showing greater detail of registers and associated components.

Referring again to FIG. 4, there is shown a data multiplexer 154 coupled to the processor 104 that receives a search term and/or focus term in this example and multiplexes that data corresponding to the term and stores the term in a register 156 and labeled Register A. A very long data word is received from the VLDW memory 124 and into another register 160 labeled Register B and the Boolean logic circuit 164 receives and logically operates on the data as words from both Registers A and B, and outputs the result as the Boolean inner product corresponding to the sum logic 164, which is sent as the processing results to the FIFO buffer 150 as the storage buffer. The DMA controller 120 in this example controls the movement of the very long data words from the VLDW memory 124 to the different processing pipelines 130 under the governance of a computer software program operating in the processor 104, and the data moves between the VLDW memory 124 and the processing logic unit 128 as very long data words that can range in length from about 1,000 bits to at least one million bits. The data multiplexer 154 may also reformat words from more conventional data words, such as 64-bit data words as received from the processor 104 into a very long data word format. Thus, a very long data word as a focused search term (FIG. 3) may operate via Boolean operations as in the vector processing unit 138 and as part of the processing logic unit 128 to produce to the sum logic 164 (FIG. 4).

Figure 5:
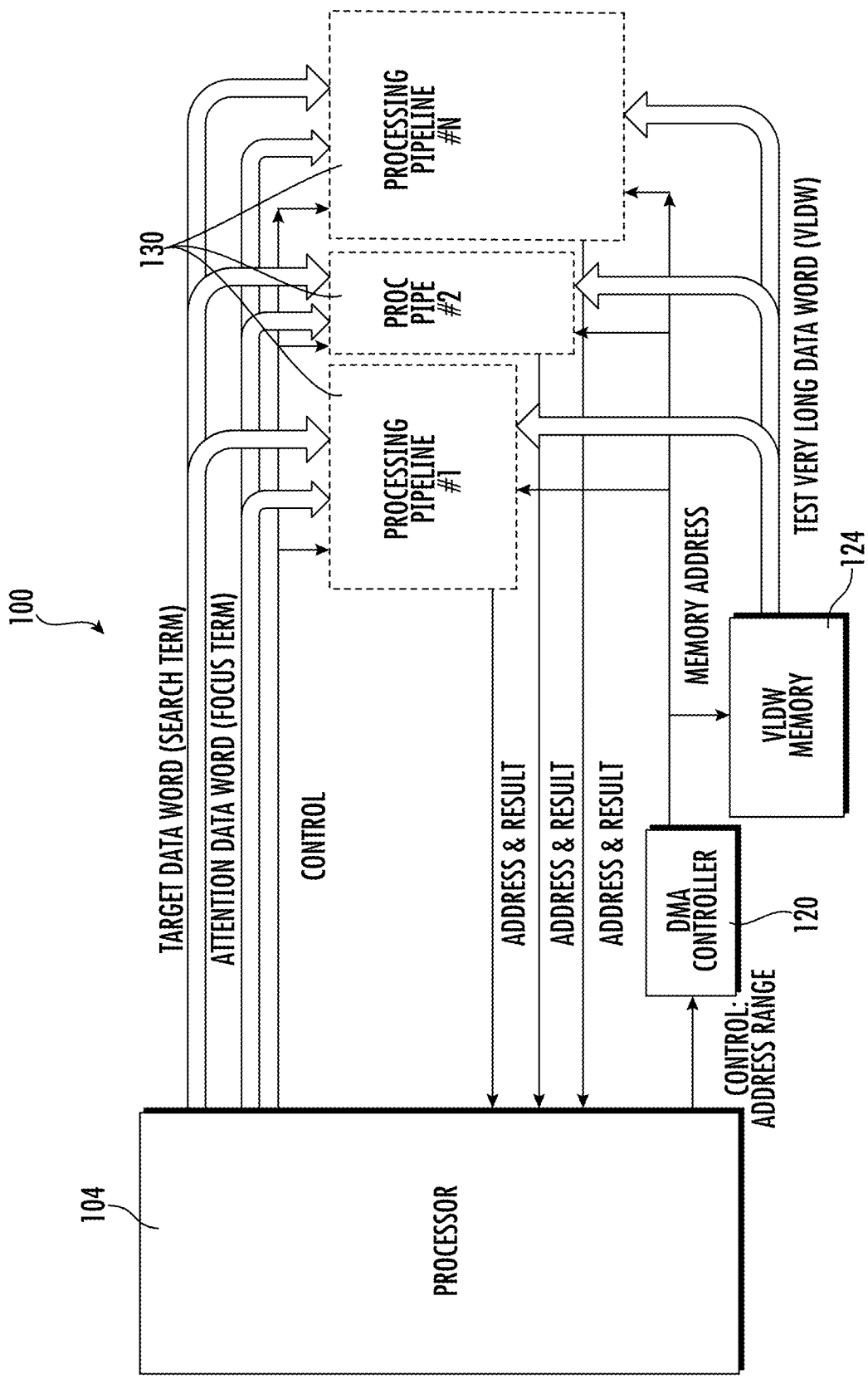
FIG. 5 is another block diagram of the synaptic coprocessor showing multiple processing pipelines.
Figure 6:
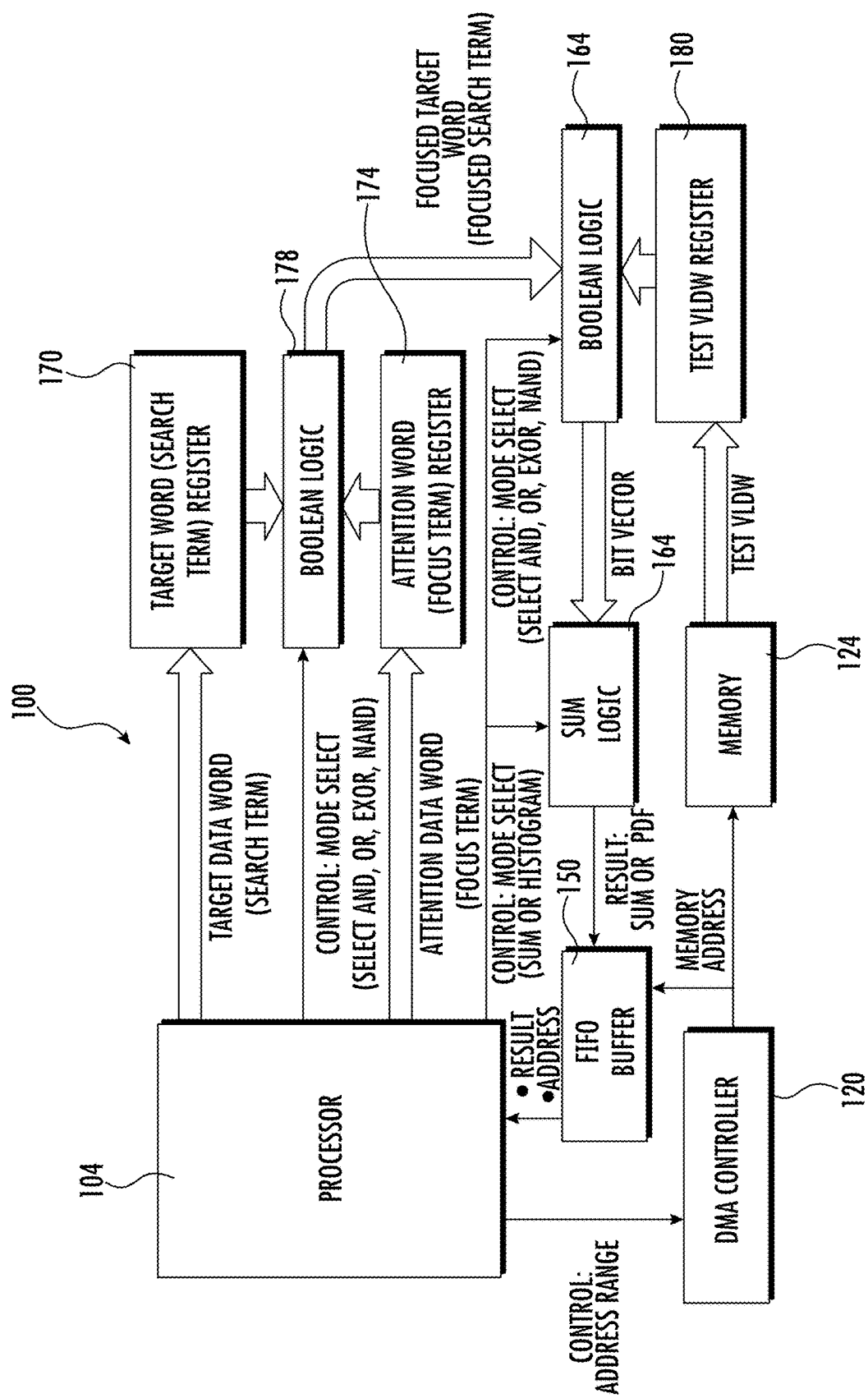
FIG. 6 is another block diagram of the synaptic coprocessor showing a processing pipeline and data flow.

Referring now to FIG. 5, there are illustrated multiple processing pipelines 130 in which a search term, a focus term and control signal are each generated from the processor 104 and received within each of the processing pipelines 130. The terms may be the same or different. The generated control signal received into each of processing pipelines 130 may be individually selected for a specific Boolean operation in each of the respective processing pipelines 130. The address of the test VLDW from the VLDW memory in this example and result as the Boolean inner product from each processing pipelines 130 may be sent back to the processor 104 for further logical processing and/or comparison in an example. The processor 104 may output a control signal for an address range to the DMA controller 120, which operates with the processing pipelines 130 and the VLDW memory 124 to select via a memory address the test VLDW and input as selected test very long data words. The processor 104 may generate target data words as search terms and attention data words as focus terms for the respective target word (search term) (FIG. 6).

The target data word as the target word or search term may be generated from the processor 104 and sent to the Target Word (search term) Register 170 and the attention data word as a focus term generated by the processor 104 and sent to the Attention Word (focus term) Register 174. Boolean logic 178 operates on data contained in both the Target Word Register 170 and Attention Word Register 174 and outputs to Boolean logic circuit 164, which receives the test VLDW from the test VLDW register 180 and outputs a bit vector to sum logic 164.

A control signal may also be generated from the processor 104 to select a mode in the sum logic 164 where the Boolean inner product may be expressed, and together with other Boolean inner products as a histogram, representing a probability distribution. For example, there could be a number of 64-bit words, and certain "hits" may be scattered to the low end and high end, and it is possible to obtain a probability distribution as in 64 bins. Each bin may be the sum of the number of hits in 1,000 bits, and the synaptic processor 100 obtains a 64 point approximation to the distribution. This is a helpful way to determine if a first answer A is better than a second answer B. One aspect is if the nodes for all characteristics are randomly distributed across the entire range, it may be more difficult to read into the correlation of low end versus the high end. For this reason, the data may be arranged pseudo-randomly, and in an example, with globally random and locally ordered arrays, where the distribution of data is not fully randomized.

Figure 7:
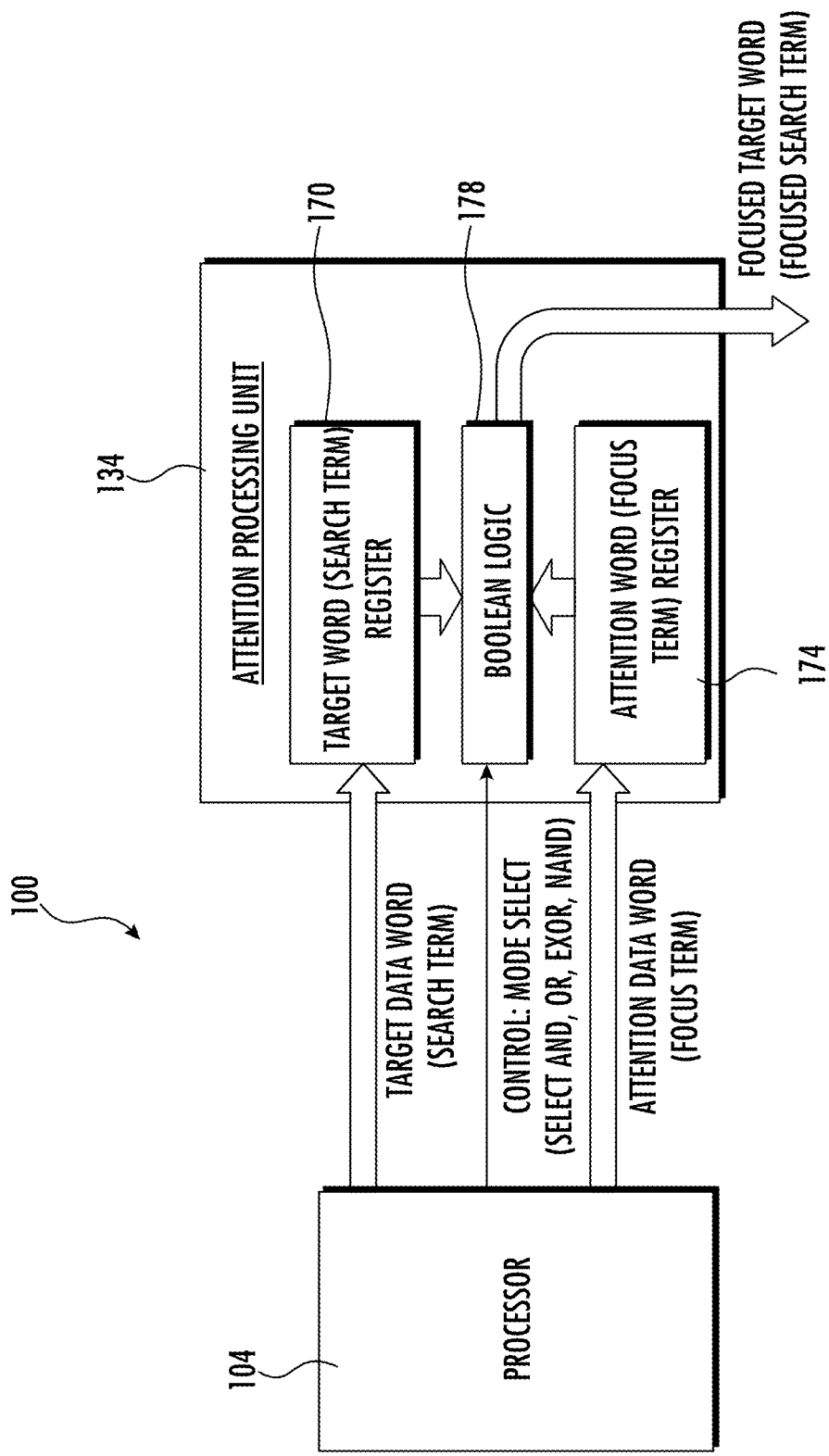
FIG. 7 is a block diagram of the synaptic coprocessor showing details of the attention processing unit of FIG. 3 that produces a focused search term.

Referring now to FIG. 7, there is illustrated the attention logic as part of the attention processing unit 134 of FIG. 3 and illustrating the Target Word Register 170 for the search term, and the Attention Word Register 174 for the focus term and the Boolean logic circuit 178 that outputs the focused target word, i.e., focused search term. Similar components are shown in FIG. 6. This attention processing unit 134 allows the search term to be stripped down to a lower weight vector for processing in the vector processing unit 138 (FIG. 3). This lower weight vector reflects content of interest or content to exclude. The logic circuit as the attention processing unit 134 may employ a very long arithmetic logic unit (ALU) and Boolean logic 178 to combine the target word as the search term and the focus term as the attention word in many possible ways to strip the vector down to what is of interest or what should be excluded. The Boolean logic 178 at the attention processing unit 134 is placed into one of several possible Boolean operational modes by the processor, e.g., AND, NAND, OR, NOR, EXOR, Left Circular Shift, and Right Circular Shift.

Figure 8:
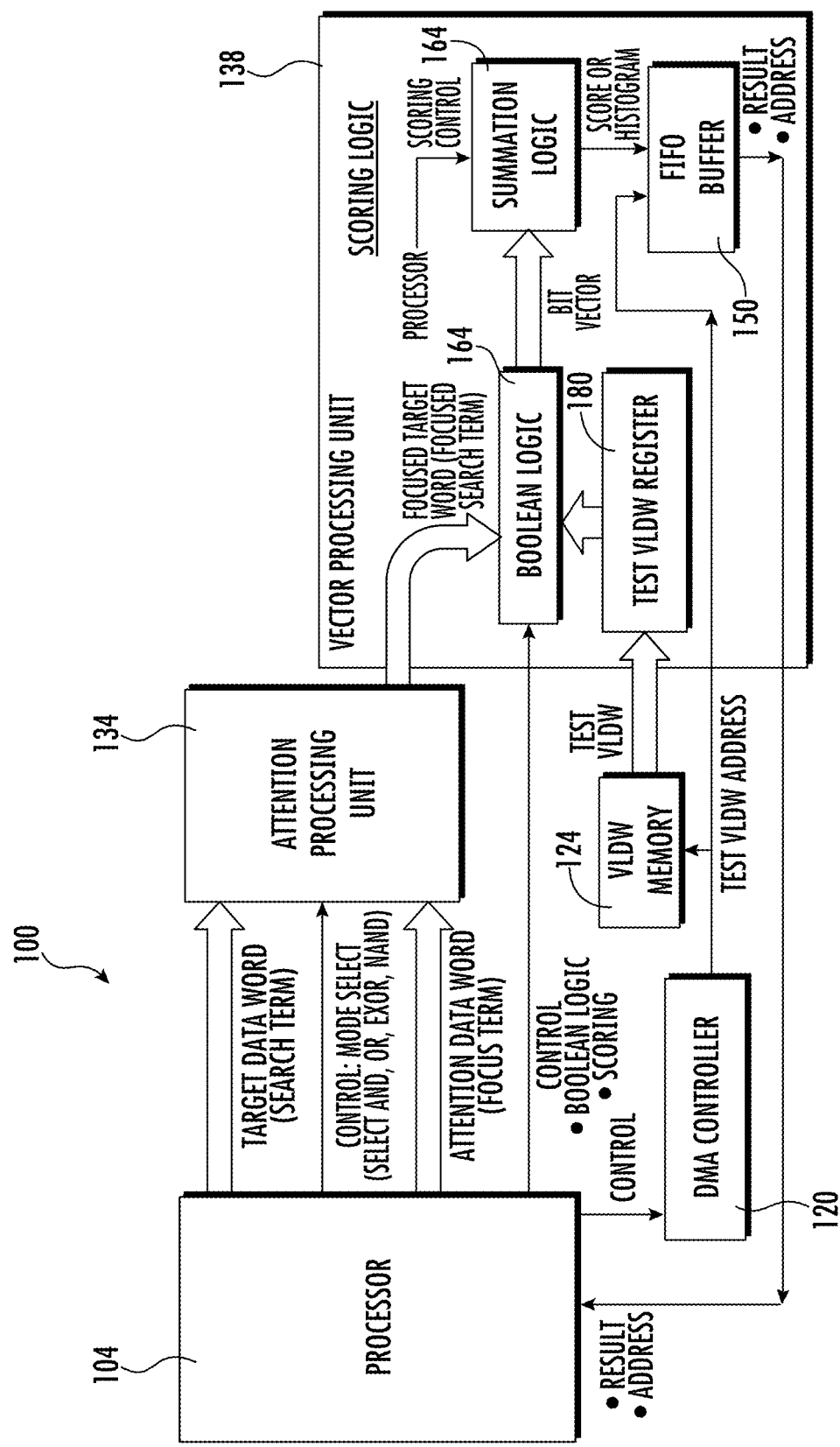
FIG. 8 is another block diagram of the synaptic coprocessor showing details of the vector processing unit of FIG. 3.

Referring now to FIG. 8, there are illustrated further details of an example of the vector processing unit 138 of FIG. 3 and showing the scoring logic functions that occur within the vector processing unit as part of the processing logic unit 128. The focused search term may be received from the attention processing unit 134 and the Boolean logic circuit 164 outputs a bit vector to the summation logic circuit 164 and the resulting "score" or histogram is stored in this example within the FIFO buffer 150. The VLDW memory 124 may store thousands or millions of the very long data words and the results of the summation may be loaded or updated to the processor 104. Operations may be controlled at a high level. The Boolean logic circuit 164 may perform a dot product calculation in some examples.

In the synaptic coprocessor 100 as described, floating point multiplications are not computed, and instead, the very long data words (VLDWs) are processed via the processing logic unit 128 to perform bit operations on multiple registers, such as $D_I=(A_I \text{ AND } B_I) \text{ AND } (\text{NOT } C_I)$, where A, B, C, and D are 64 kilobit registers and I indicates the bit number ranging from 1 to 216. The processor 104 in an example may perform bitwise operations such as Bit Set/Bit Get and Bit Shifts as single word operations with AND, OR, EXOR, NOR, NAND, Left Circular Shift, and Right Circular Shift and complement with Bit Level Masks. The Bit Level Dot Product may require greater than one clock cycle to complete. Multiple coprocessors may be implemented within a chip to increase throughput.

Figure 9:
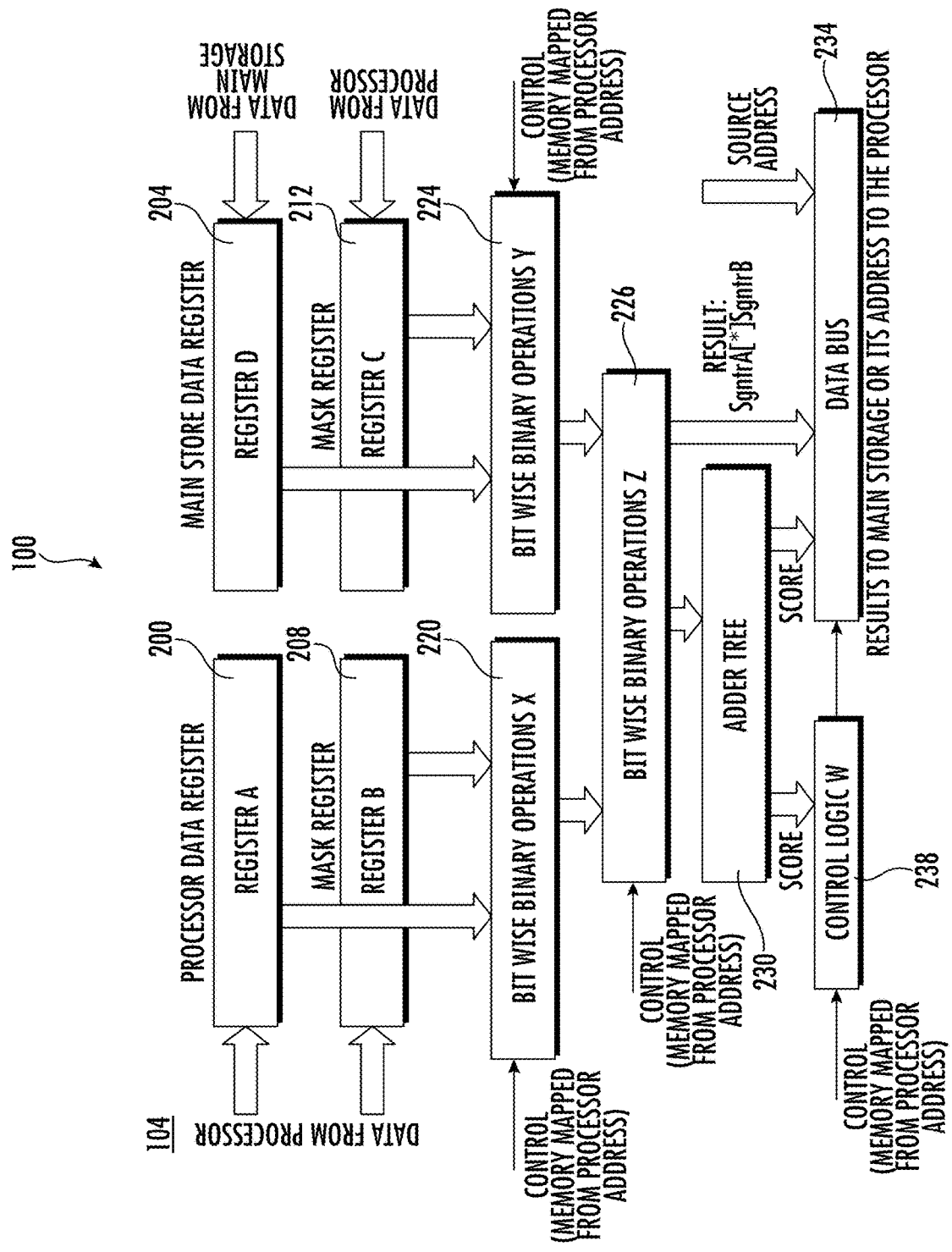
FIG. 9 is a block diagram of the synaptic coprocessor showing an example of various registers.

Referring now to FIG. 9, there is illustrated a schematic block diagram of an example of another segment of the synaptic coprocessor 100 architecture that illustrates different data registers and associated bitwise binary operations. An example processor data register (A1) 200 receives data from the processor 104, such as the search term or focus term. The main store data register (D1) 204 may receive the test VLDW. Mask registers (B1) 208 and (C1) 212 receive data from the processor 104. Control signals are input with memory mapped from the processor 104 address and data from the registers 200,204 input to the logic circuits for bitwise binary operations X and Y (220,224) with those circuits also receiving data from mask registers 208,212, which receives input from further bitwise binary operations Z 226, which in turn, receives output from the bitwise binary operations X and Y (220,224). The adder tree 230 is shown. Data is delivered over the data bus and includes input from the control logic circuit W 238.

A masking function may not be required when there are no constraints. In a real-life example, a main storage such as memory 124 may hold signatures for investment types as an example to be searched for semiconductor stocks with at least 15% growth for the last two years. In this example, there are no constraints. The processor 104 loads the signature for a semiconductor stock with a 15% growth over the last two years into Register A1 (200) and commands a search over all investment signatures in the memory 124. The DMA logic as the DMA controller 120 in this example loads each investment signature one at a time, at the full clock speed of the processor 104. With each clock in this example, the loaded signature is bit-wise ANDed with the signature and a number of resulting ones in a register Z (not shown) as part of the bitwise binary operation Z 226 is counted by the adder tree 230. Each result in the register Z that exceeds the threshold is programmed into control logic W 238 and sent to the processor 104 via the data bus 234.

With constraints, a selected region of the main VLDW storage 124 is to be searched to determine the response or distance of each signature from a target signature subject to possible constraints. For example, all investment types except junk bonds may be searched, or alternatively, only selected aspects of an input target may be searched, such as only mutual funds. The match of selected aspects of the signatures from memory 124 may be scored and is processed one very long data word at a time over a selected range of addresses. The results may be copied into another region of memory 124 or the score may be copied to the main memory or sent to the processor 104 with source addresses.

As an example set-up, the processor 104 may load into Register A1 200 the aggregate signature of the desired results and load into mask register B1 208 any constraints about which bits to include or exclude from the signature in Register A1. The processor 104 may load a control field that controls the operation of a register X associated with bitwise binary operations X 220, according to whether the "masking" operation is one of inclusion or exclusion or other binary operations. The processor 104 may load into mask register C1 (212) any constraints about signatures to be tested, in terms of bits to include or exclude. The processor 104 may load the control field that controls the operation of a register Y associated with bitwise binary operations Y 224, according to whether the "masking" operation is one of inclusion, exclusion, or other binary operations. The processor 104 may load into the DMA controller 120 the first and last address of the region of the storage for the VLDW memory 124 to be searched and load the control field that controls the operation of the register Z and associated bitwise binary operations Z 226 and the type of binary operation to be performed on the inputs from registers X and Y associated with respective bitwise binary operations X and Y 220,224. This may be a bit-for-bit AND as the Boolean operation between X and Y. The processor 104 may load a control field that determines whether the final result is to be taken from register Z associated with the bitwise binary operations Z 226 or the adder tree 230, or to move the result, and whether to threshold test the result.

Figure 10:
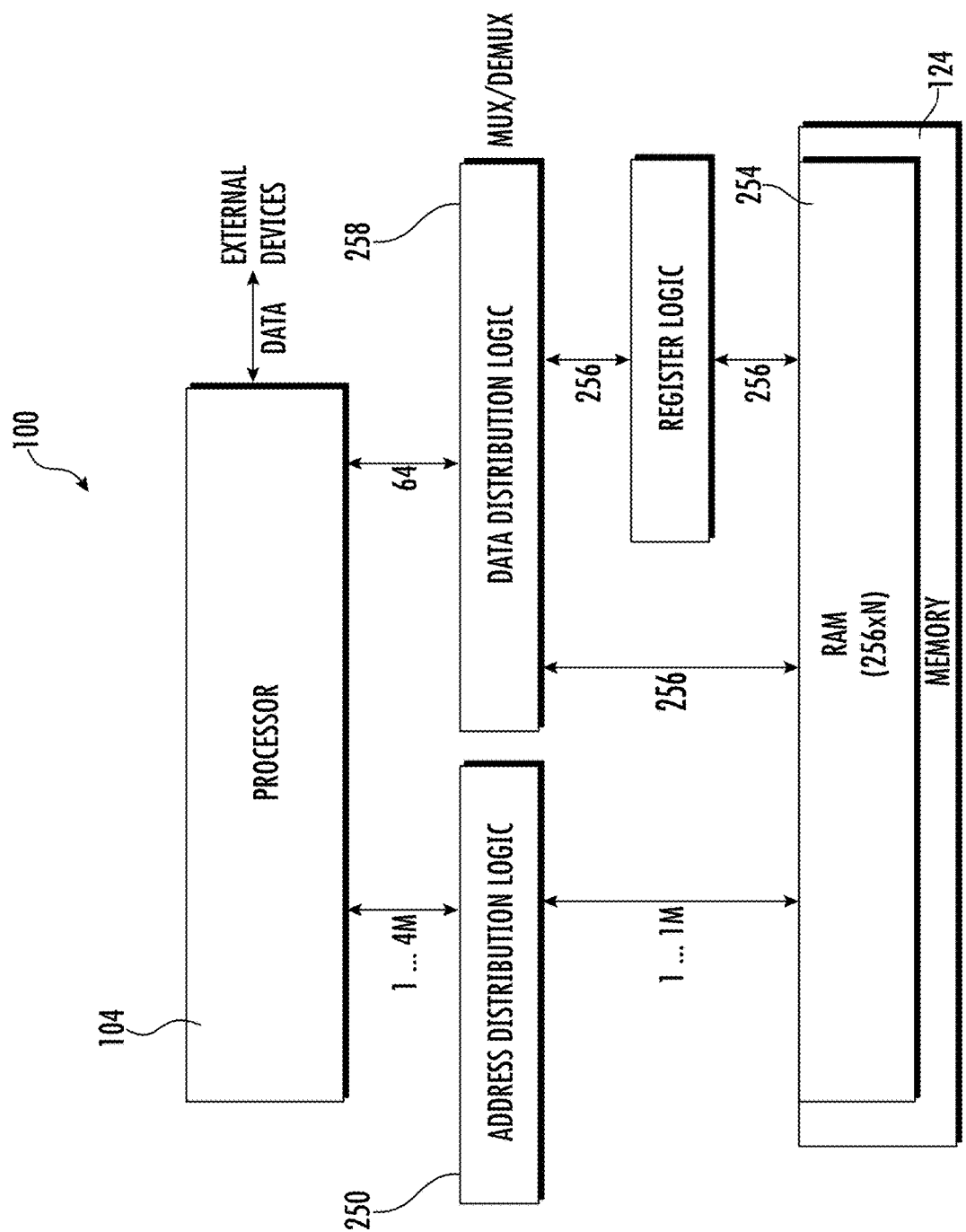
FIG. 10 is a block diagram showing the address and data distribution in the synaptic coprocessor example of FIG. 9.

Referring now to FIG. 10, there is illustrated another schematic block diagram of logic and showing an address distribution logic 250 between the processor 104 and RAM 254 that may include very long data word RAM storage. The data distribution logic 258 may include multiplexing and demultiplexing functions and is coupled to the register logic 262, which may include a notation of that data distribution and number of bits in a data word. The register logic 262 may operate on very long data words such as from a smaller 256 bits wide to 256 megabits wide and the register logic may perform bit-wise operations on all bits, including a very long data word on each cycle of the clock, such as a 1 GHz clock. The very long very data words may be stored in the VLDW memory 124 that may include RAM 254, and data words transferred to and from the register logic 262 on each clock cycle. This allows high input and output and processing rates that are roughly 1 GHz, assuming one N bit for very long data words as equal to one bit of binary operations per second. The register logic 262 and RAM 254 may be able to communicate with a host CPU using CPU words as 64-bit words, for example.

At the address distribution logic circuit 250, the clock may increment address and least significant bits (LSBs) when data is transferred from the processor 104 to an address buffer as part of address distribution logic 250 or from an address buffer to the processor 104. On the RAM 254 side as memory storage such as for the address may have the least significant bit set and the transfer to and from the memory may occur on a single clock cycle. The address distribution logic circuit 258 may include an address buffer and address least significant bit controls as an up-and-down counter and any control logic and a clock input.

Figure 11:
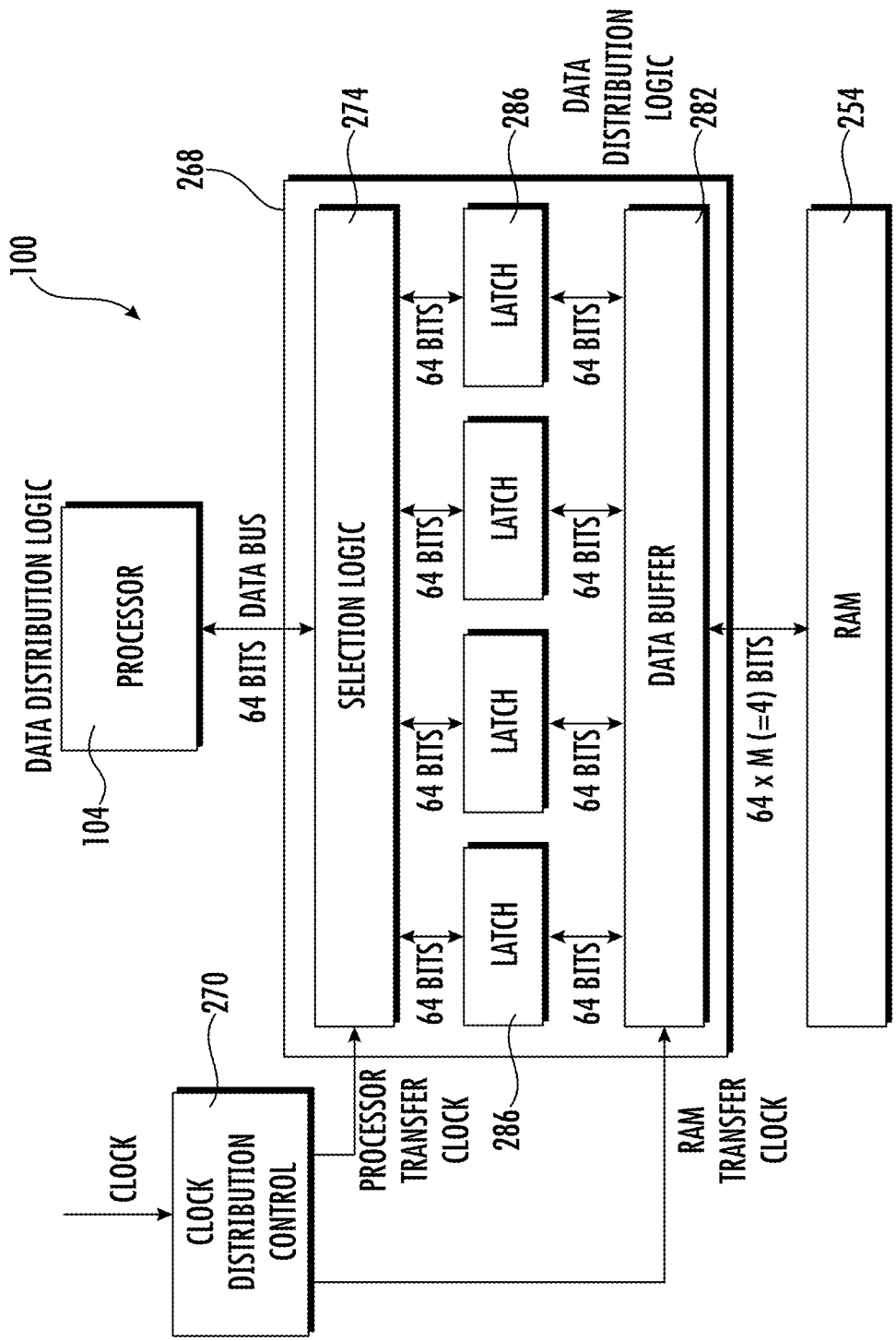
FIG. 11 is a block diagram showing the data distribution logic in the synaptic coprocessor of FIG. 9.

Referring now to FIG. 11, a schematic block diagram of example details of the data distribution logic 268 is illustrated, and showing the clock distribution control circuit 270 and the processor 104 that couples to a selection logic circuit 274 and a data buffer 282 operative with the memory as RAM 254 in this example and receiving input from a plurality of latches 286, e.g., flip flops, all operative in this example with the selection logic circuit 274. The data input to the processor 104 from an external device (FIG. 10) may be a standard data word such as a 64-bit data word and the data input to the data distribution logic 268 from the memory may be a data word, e.g., N times 256. For example, the processor data interface may be 64 bits and the RAM interface may be 256 bits where M=4 and the processor data interface may be 64 bits and the RAM interface may be 256K bits with M=1024 as a non-limiting example.

Figure 11A:
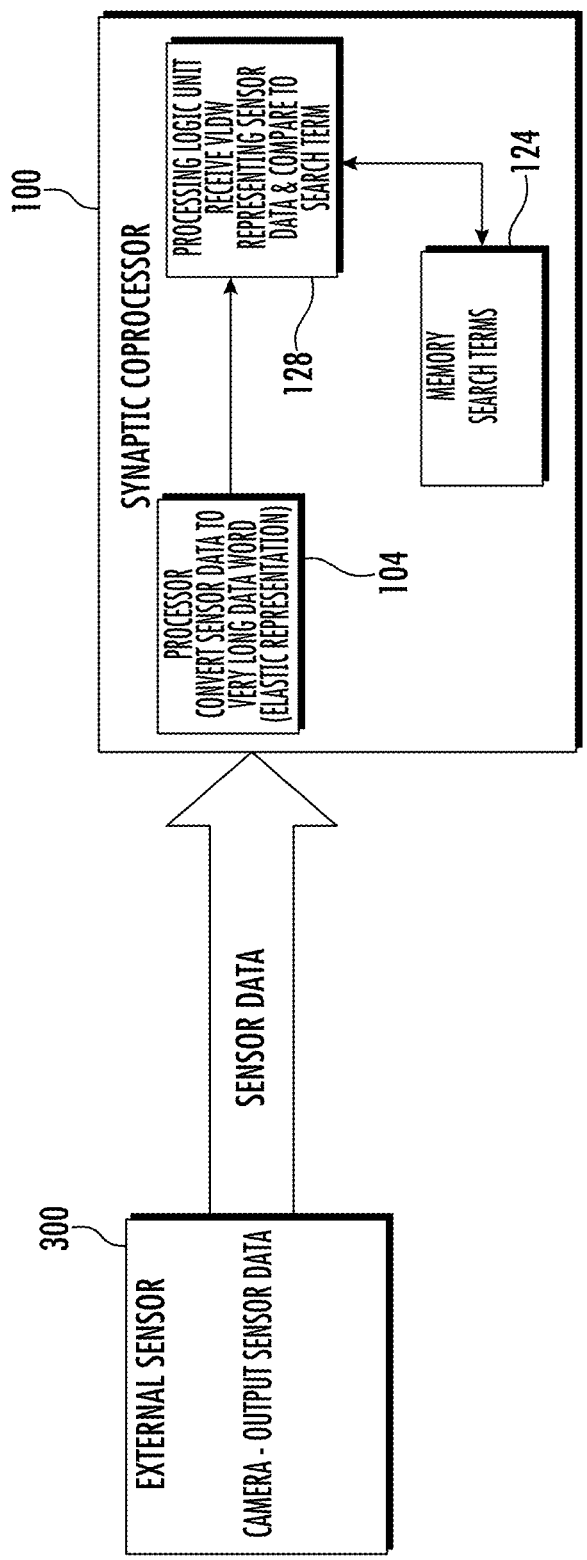
FIG. 11A is a block diagram of an external sensor connected to the synaptic coprocessor that generates data to the synaptic coprocessor for conversion into a very long data word.

Referring now to FIG. 11A, there is illustrated an external sensor 300, such as a camera, that is configured to generate output sensor data. The external sensor 300 may include a processor (not shown) that configures the output sensor data as smaller bit words that are combined by the cognitive coprocessor 100 into a very long data word. The processor 104 is configured to receive the sensor data and generate a very long data word corresponding to output sensor data. The processing logic unit 128 is configured to compare this converted very long data word to a search term. The external sensor 300 may be a camera having object recognition software that provides an input as data to describe what the sensor has detected in the very long data word formats, such as an elastic representation VLDW. That output sensor data is converted into a very long data word and may be compared to search terms and focus terms loaded into any processing pipelines 130. In the alternative, the sensor data may be loaded into the processing pipelines 130 as a search term and compared against very long data words from memory 124, looking for strong matches and various attention settings.

As noted before, the processor 104 may be configured to perform calculations at a single clock rate and compute a Boolean inner product between the search term and the test VLDW at a latency to obtain the results after multiple clocks. The bitwise ANDing may be started in one clock, but the process may require complex adder trees, and the calculations may be accomplished in a processing pipeline 130, e.g., a new ADD can be started every clock. Carry-Ahead Adders (CAA) may be used, which may include Log $2(n)$ gate delays where "n" is the word size in bits.

Figure 11B:
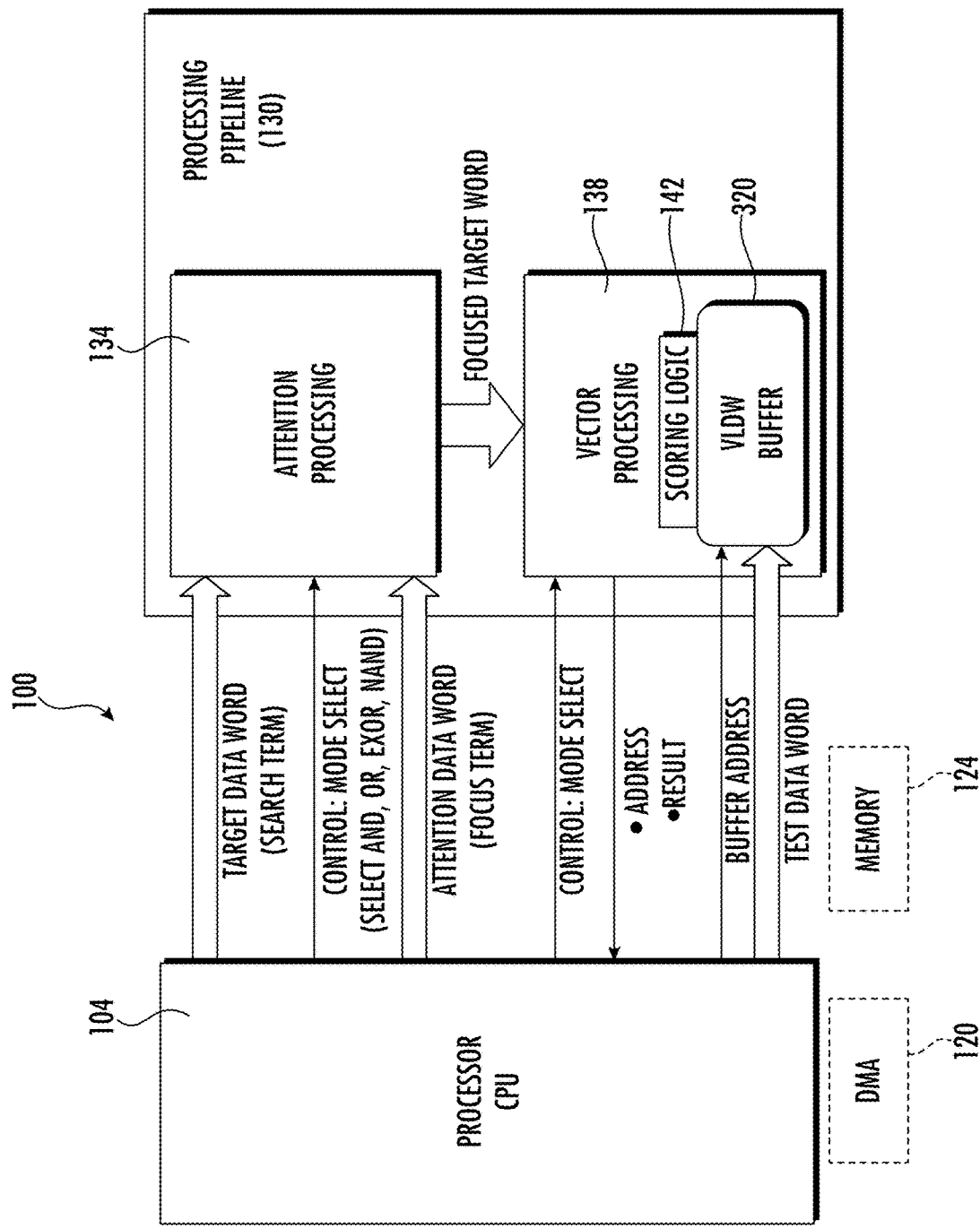
FIG. 11B is another example of the synaptic coprocessor shown in FIG. 3, but showing a buffered processing pipeline.

Referring now to FIG. 11B, there is illustrated another embodiment of the synaptic coprocessor 100 and showing a VLDW buffer 320 as part of the vector processing unit 138 and optional DMA controller 120 and VLDW memory 124 shown in dashed format. A buffer 320 in the processing pipeline 130 compares input data as a target data word against entries in its local or internal memory buffer 320 instead of using the DMA controller 120 to compare against a block of entries in the main VLDW memory 124. This configuration may use less hardware since it is not necessary to employ the DMA controller 120 and VLDW memory 124. The standard processing pipeline 130 using the DMA controller 120 and VLDW memory 124 compares each input VLDW against all the VLDWs within some segment of memory, using DMA logic to scan through the memory. The processing pipeline 130 that incorporates the VLDW buffer 320 as part of the vector processing unit 138 does not compare and input a VLDW against a VLDW in memory 124, and instead, the host CPU as the processor 104 loads one or more VLDWs into the VLDW buffer 320 as part of a processing pipeline 130, and the processing pipeline compares each input VLDW against the VLDWs stored in the local VLDW buffer 320.

The same focus logic as described may be employed and a change is that the source of VLDWs to be compared moves from the main VLDW memory 124 to the local VLDW buffer 320. Each processing pipeline 130 may have different VLDWs stored into its local VLDW buffer 320. It is possible to use a mix of "standard" and "buffered" processing pipelines 130. For example, there may be two standard (using DMA control) and six buffered (using buffer 320) processing pipelines and another design may use four processing pipelines 130 that are incorporating data from the VLDW memory 124 and the DMA controller 120 and four processing pipelines 130 may include the VLDW buffer 320. Thus, the processing logic unit 128 in this example may include a processing buffer, i.e., a VLDW buffer 320, within a subset of processing pipelines 130 and the processing logic unit 128 may receive a search term from the processor 104 and compute a Boolean inner product between the search term and the test VLDW indicative of the measure of similarity between the test VLDW and the search term. The processing logic unit 128 may include a plurality of processing pipelines 130 as Boolean logic circuits, each having a processing buffer 320 into which a plurality of test VLDWs are buffered. This structure and function as explained with reference to FIG. 11B may work with the optional VLDW memory 124 and DMA controller 120 as illustrated. Thus, the processing logic unit 128 may include a first plurality of processing pipelines 130 as Boolean logic circuits each having a processing buffer 320 into which a plurality of test VLDWs are buffered, and a second plurality of processing pipelines 130 as Boolean logic circuits and each configured to receive a test VLDW from the VLDW memory 124.

Figure 12:
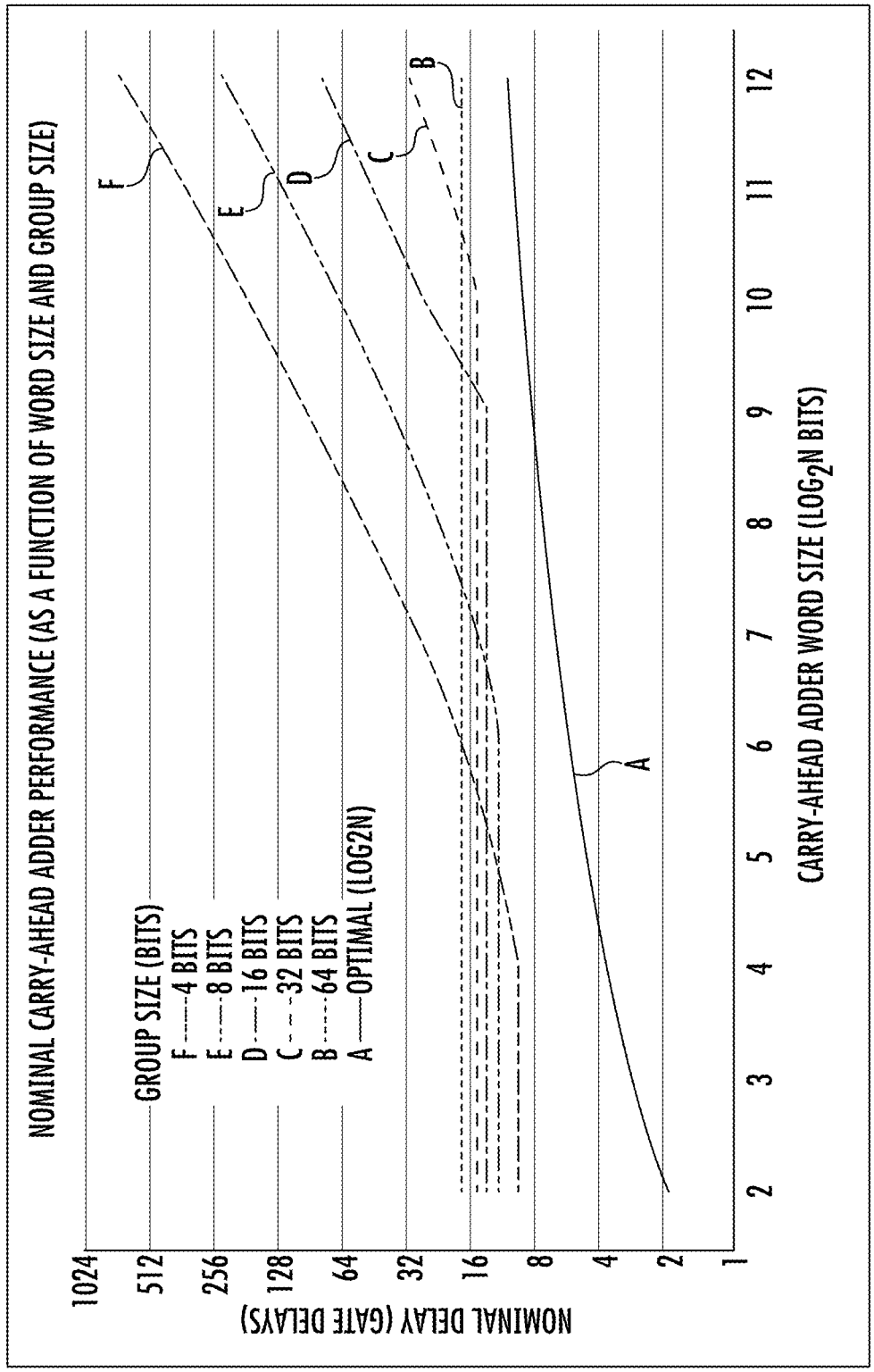
FIG. 12 is a graph showing Carry-Ahead Adder (CAA) performance as a function of word size and group size.

FIG. 12 shows a graph having a plot for the delay of a CAA (Carry-Ahead Adder) as a function of word size with word or group sizes ranging from 4 to 4,096 bits and the lines referenced with letters A to F. From simulation results, it is evident that it is possible to obtain the "Log 2N" gate delays, which is shown in the lower curve of FIG. 12 labeled "A." The graph of FIG. 12 indicates that by using larger groups, this synaptic coprocessor 100 may be approximated with less nominal delay. It is possible that multiple levels of groups may be helpful. Much wider adders may be used, and the simulation shows the positive results.

Figure 13:
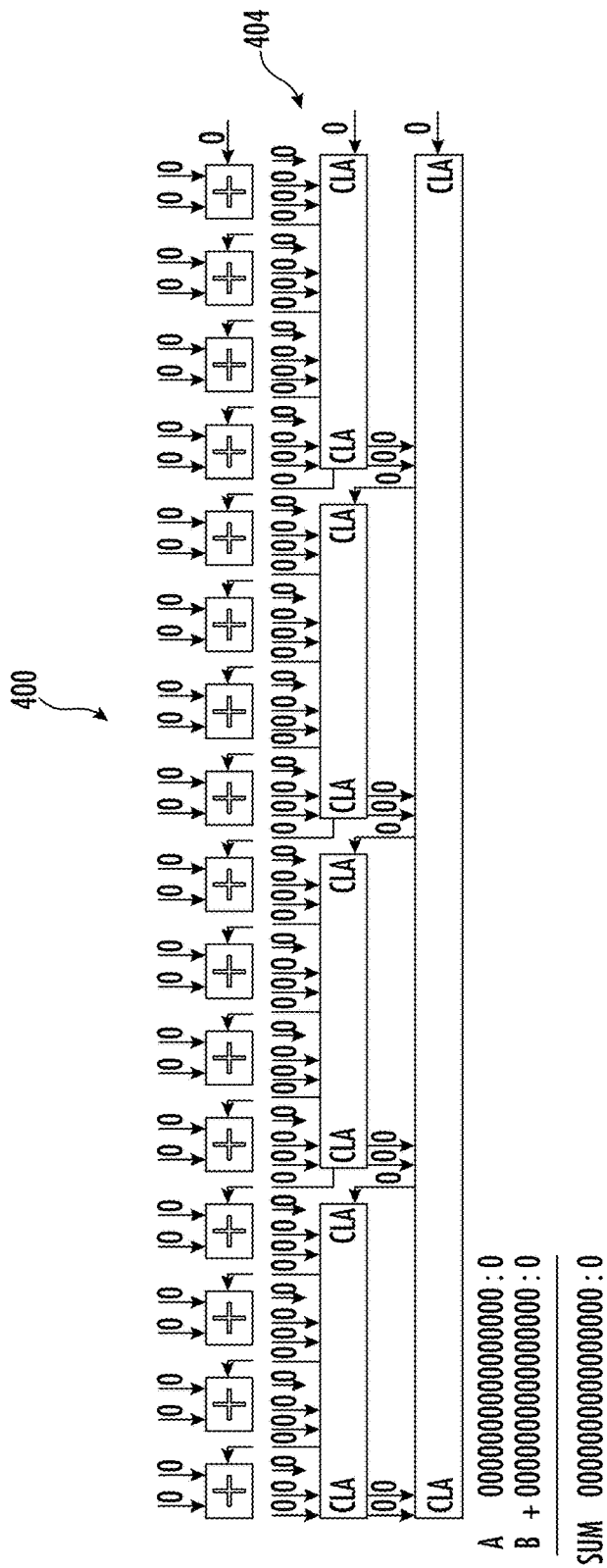
FIG. 13 is a schematic block diagram showing logic for a 16-bit wide adder with four-bit groups that can be used with the synaptic coprocessor as a non-limiting example.

Referring to FIG. 13, there is illustrated a block diagram of an example from a simulation of the logic for a 16-bit wide adder illustrated at 400 with four-bit groups as part of the carry look ahead adder segment 404. This block diagram shows the sum and the time taken to generate all sum bits as (10.2) units and the delay to calculate the sum in each bit position.

Figure 14A:
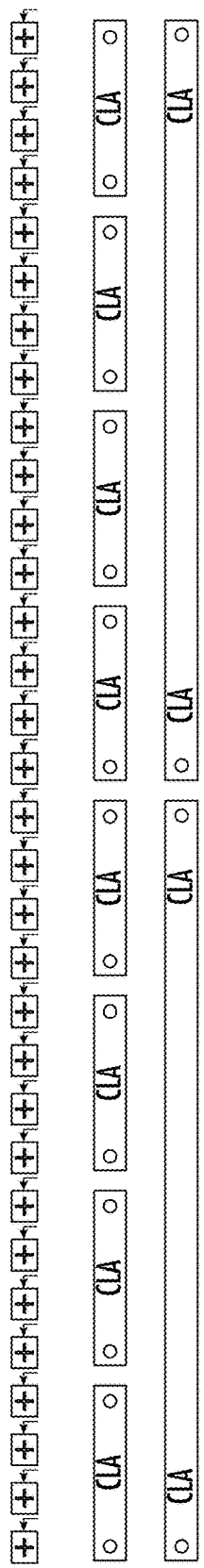
FIGS. 14A-14C are schematic block diagrams showing logic for a 64-bit wide adder that can be used with the synaptic coprocessor as a non-limiting example.
Figure 14B:
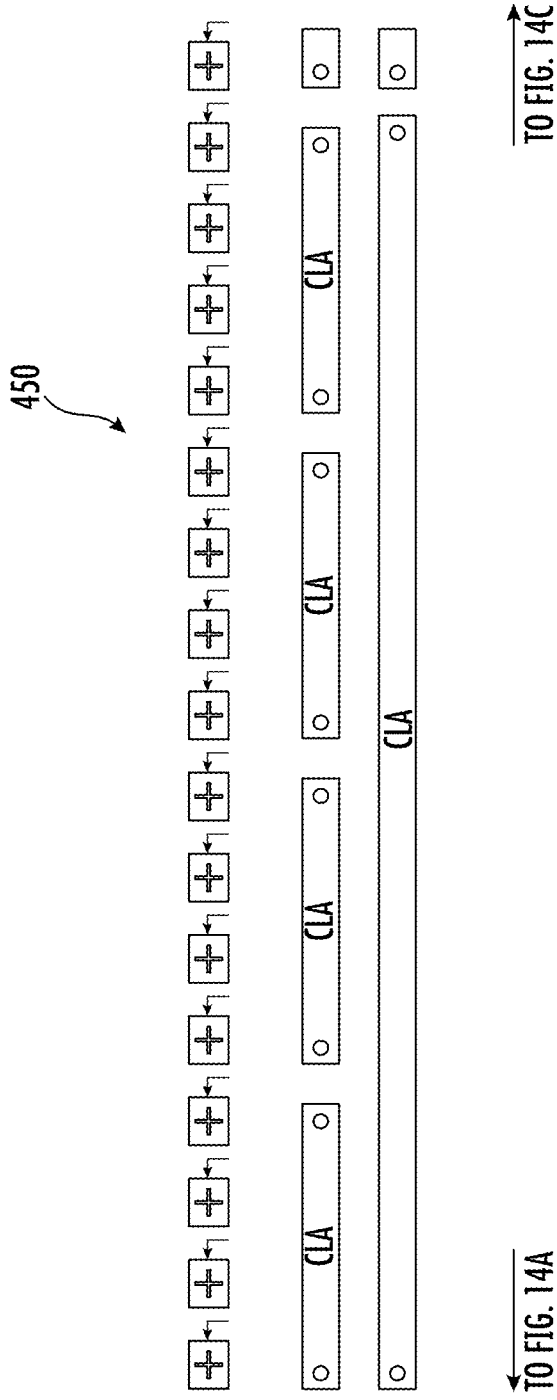
Figure 14C:
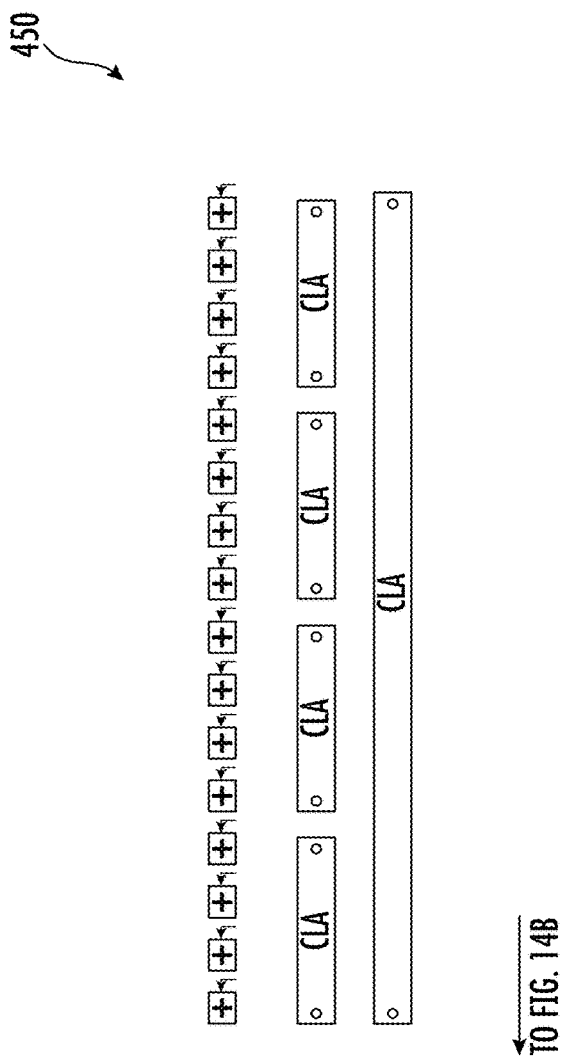

Referring now to FIGS. 14A-14C, there is illustrated an expanded schematic block diagram of the logic circuit 450 for 64-bits processing and a carry look ahead adder. The schematic block diagram would become greatly more complicated for 1,024 bits, and for 1 million bits so complicated it would not be producible on even large sheets of paper, the increasing complexity would make reproduction as a schematic block diagram impossible with many square feet of paper in order to be readable.

An adder tree may impose a processing latency of log 2 clocks, such that for a 1 million bit word, there would be a 20 clock latency. The first stages in an example may have small values to be added, but may not require carry look ahead logic. At the bottom of the adder tree, there may be some benefit to using carry look ahead logic. The synaptic coprocessor 100 may use a relatively slow clock rate, somewhere between 500 MHz and 1 GHz, because read access memory (RAM) is much slower than computational logic. The slow clock rate may make it easier for an adder tree to keep up. Thus, it is possible that a 4 GHz clock for the adder tree logic as carry look ahead logic may be used, but new inner products may be computed at a 1 GHz rate or lower.

There now follows a description of the very long data words also referred to as elastic representation VLDWs that represent a knowledge representation placed into binary form. It should be understood that the synaptic coprocessor 100 may operate with a systematic system that represents knowledge within an artificial neural network (ANN) and includes a large number, e.g., many thousands of "nodes," where each node may be assumed to approximate the behavior of a biological neuron. Meaning may be ascribed to a set of nodes and not to one single individual node, and thus, a set of nodes that means "dog," for example, may approximate the idea of a memory "engram" in a brain. Any piece of information may be referred to in general terms as a "concept" and every concept may be represented by a set of nodes in the ANN.

Figure 15:
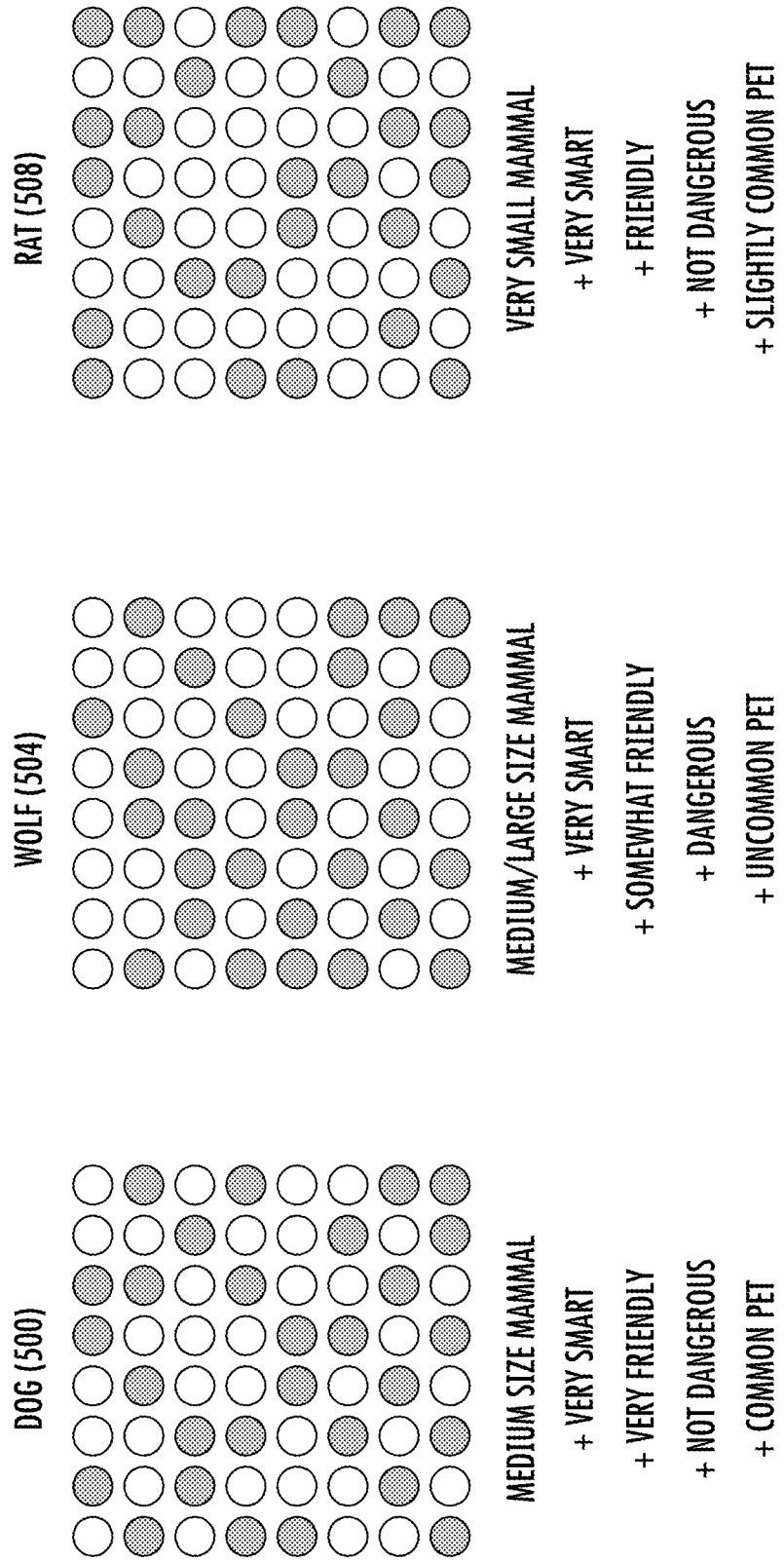
FIG. 15 is a simplified example of elastic representation VLDWs that can be used with the synaptic coprocessor as a non-limiting example.

An example of the elastic representation VLDW for dog 500, wolf 504, and rat 508 are shown in FIG. 15, showing the basic categories and data in a schematic diagram that may be encoded as a single illustration into a very long data word. There are a near-infinite number of acceptable elastic representation VLDWs. These simple schematic drawings of these elastic representation VLDWs show that overlapping data may correspond to the matching of "ones" when the Boolean inner product is computed. This type of data representation indicates that optical processors and associated optical computing may be used. A laser may quickly determine matches and overlaps.

One aspect is that similar concepts have a similar representation, e.g., two ideas may be encoded by a similar set of nodes. For example, a motorcycle may be compared to a car and in many ways, they are similar. They both convey passengers and have roughly the same size and cost, both travel on roads and have other similar attributes and details. They are different, however, in the number of passengers the vehicles carry and the ability to travel off-road and the ability to travel in inclement weather, and thus, the two vehicles have some similar representations and other representations not similar.

A possibility is to encode cars and motorcycles with these data attributes to the extent relevant to the mission. For example, the representation for a car may encode its size, weight, MPG, range, safety information, and similar details. Similar encoding may be used for motorcycles. A representation for each may be the aggregation of the representations for each property. Thus, the representation for cars and motorcycles includes these similarities and differences and the degree of similarity and difference.

The very long data word as an elastic representation VLDW may be encoded at the desired level of detail since it contains thousands of bits, up to about at least a million bits. The attention logic unit 134 within the synaptic coprocessor 100 may focus on the most relevant attributes for a given situation. If the weather is fine, does it not matter that motorcycles are unsafe in bad weather?

The very long data words as noted above are referred to as elastic representation VLDWs in one non-limiting example. Most computer code views data in black versus white terms, and for this reason, software is often unreliable and characterized as "brittle." The synaptic coprocessor 100 processes data such that data may be compared a matter of degree. A dog is somewhat like an elephant when compared to a shark. The representations are described as "elastic" because the synaptic coprocessor 100 code is not brittle, and this property endows the representations with an innate ability to generalize, which is widely believed to be a foundational capability for artificial general intelligence. The prototypes as developed show that elastic representation VLDWs do, in fact, possess a remarkable degree of generalization, without sacrificing precision. The importance of this is that elastic representation VLDWs as very long data words and provide a technique to construct an associative memory that may retrieve stored data based on the degree of conceptual similarity between some input and the stored knowledge. An associative memory may be a starting point for building a system with artificial general intelligence.

The synaptic coprocessor 100 also addresses the role of a concept. A systematic approach to "roles" is part of the science of knowledge representation, and the synaptic processor 100 may readily test for an electric representation in various roles because the transformations of the representations in the different roles is compatible with the synaptic processor instruction set. For example, the association of "John loves Mary" is very different from the association of "Mary loves John." In both cases, the meaning is lost unless the representation can convey whether John is the subject or object in the sentence. The synaptic coprocessor 100 establishes a systematic approach to "promote" a representation of one of many possible roles and relationships, by means of prescribed mathematical transformations. This technique can be directly extended to cover more complex cases, such as "John, who is very tall, loves Mary despite her being much shorter than John."

There are elastic controls as flow constructor VLDWs. An intelligent system may not usually be built based only on data. Sophisticated systems require a significant body of control functions as part of the system design. Conventional systems often treat control as totally separate from the data and divide the design into a "control plane" versus a "data plane." The synaptic coprocessor 100 may blur the line between data and control, so that the synaptic coprocessor may embed control functions within an associative memory. Many of the advantages realized for data may be applied to control functions.

Control functions may be implemented with flow constructor VLDWs, which may be encoded as elastic representation VLDWs but also specify actions to be performed. Some of the actions may be calls to hardware drivers or commands to the synaptic coprocessor to change course or speed. Other flow constructor VLDWs may adjust the operating parameters of an associative memory by adjusting thresholds or maximum queue lengths or perhaps by modifying the parameter settings that control "breadth versus depth of search" in accordance with the urgency, risk and reward of the current situation. Still other flow constructor VLDWs can adjust the parameters that control what and how the system learns based on experience.

Figure 16:
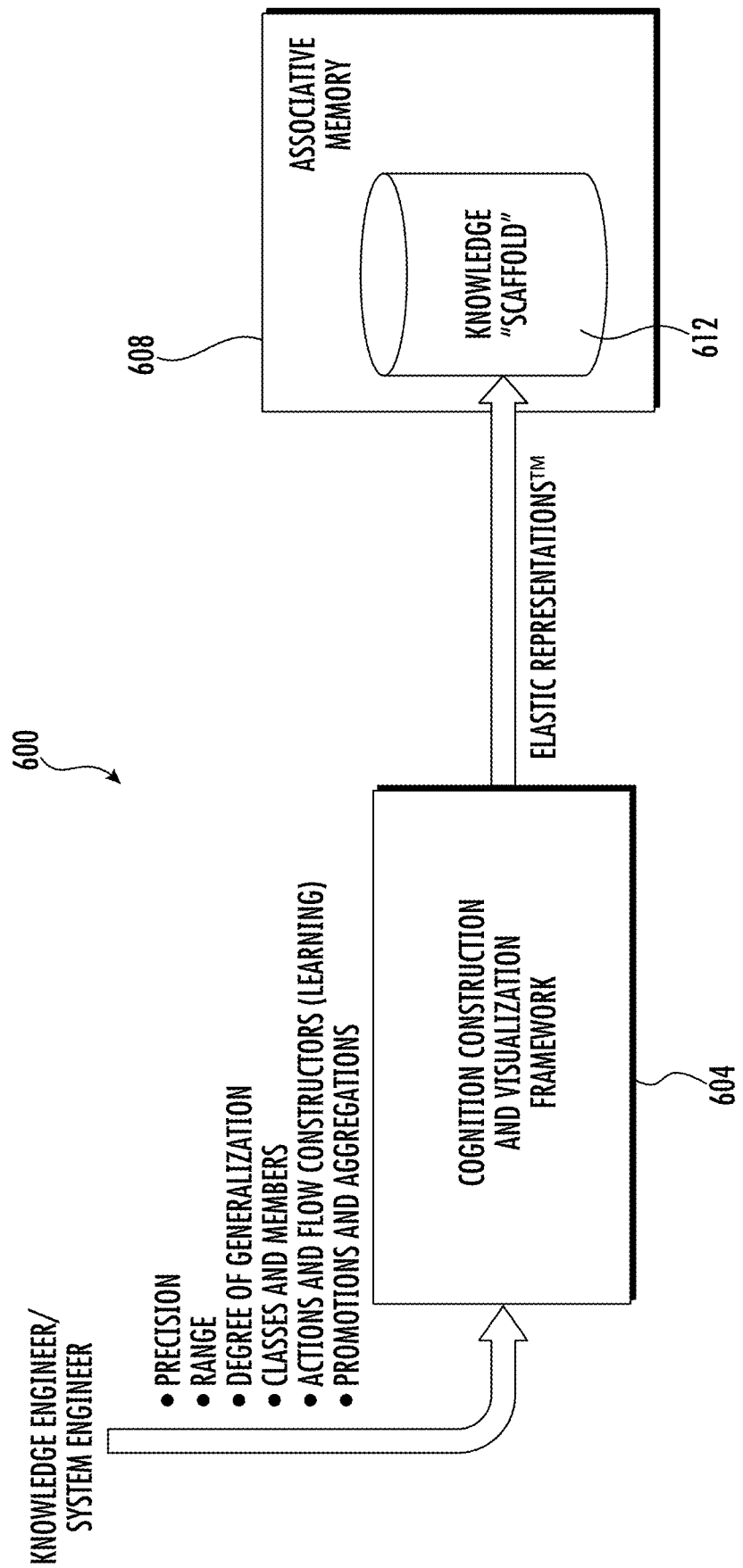
FIG. 16 is a high-level block diagram showing generally how the elastic representation VLDWs may be generated.

Referring now to FIG. 16, there is illustrated a block diagram at 600 showing how elastic representation VLDWs may be generated, and showing a cognition construction and visualization framework 604 operative with associative memory 608 that includes a knowledge scaffold 612. Many factors enter into the design of the elastic representation VLDWs and input to the cognition construction and visualization framework 604 such as:

Precision—Some concepts such as digits or financial data may be represented with good precision. A rough approximation is fine for many concepts but certainly not all.

Range—The concept of the size of a horse can often be dealt with by a rough approximation, but dogs on the other hand have sizes that span the range from Chihuahua to Newfoundland. Sometimes elastic representation VLDWs may encode the expected range of a concept.

Degree of Generalization—elastic representation VLDWs may be designed to permit the underlying concepts to be generalized beyond their normal bounds, but overgeneralization can flood the processing with matches or inferences which are too weakly related to be of any value. Too little generalization may limit the apparent intelligence of an AGI system.

Dimensions—A system typically encodes concepts in 1D or 2D representations. There may be future applications which will require three or more dimensions.

Flow connectors and flow constructor VLDWs—These building blocks control the processing flow, establish processing parameters, including learning functions, and may activate hardware drivers.

A tool may be implemented such as the Cognitive Construction and Visualization Framework 604 to simplify the complex job of building an AGI-like system using elastic representation VLDWs.

Large-scale applications of the system may require vast processing power; fortunately the very nature of elastic representation VLDWs opens the door to processing architectures which can process data at astonishing speeds in terms of operations/second and not clock speed.

Figure 17:
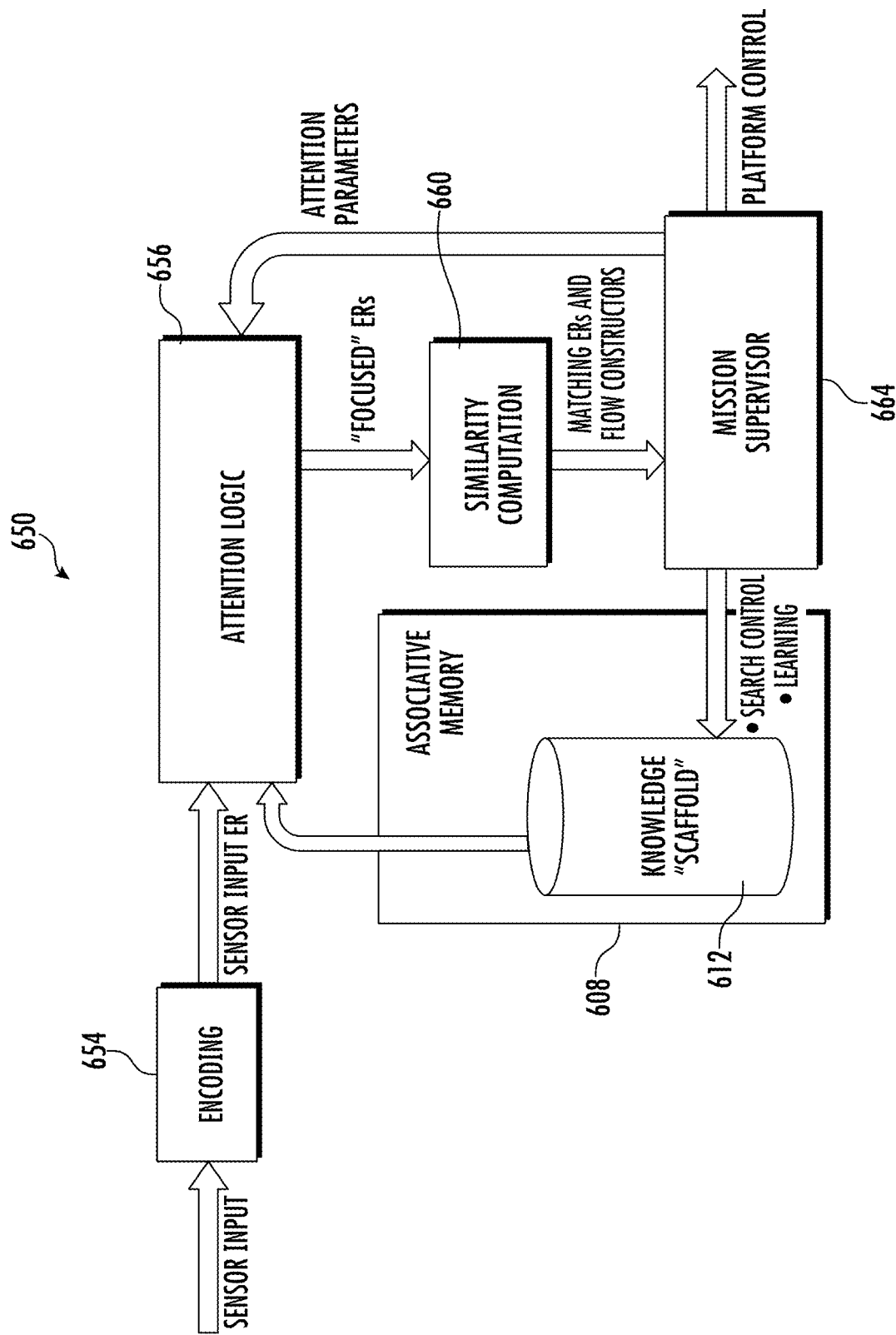
FIG. 17 is a high-level block diagram of another representation of the logic used in the synaptic coprocessor.

The synaptic coprocessor 100 may process elastic representation VLDWs at very high speeds and make it possible to implement large-scale AGI systems that process the data in real time. A general functional view of the synaptic coprocessor chip design is shown in FIG. 17 at 650. The plurality of processing pipelines that operate in parallel are not illustrated, allowing the input data to be processed simultaneously with multiple, different Attention Logic settings. Thus, for example, each input from a sensor, such as an image of a specimen that is a candidate to be collected, could be processed and encoded 654 to infer simultaneously its potential mission value. This could include its risks to the mission. Data could be obtained by collecting specimens from the ocean floor that may contain high concentrations of methane and may present a significant risk to a drilling platform, for example, and the ability to physically collect the specimen based on size, fragility, and similar factors may be advantageous. Attention logic 656 is coupled with the associative memory 608 and similarly computation circuit 660 and a mission supervisor 664.

It is possible that the synaptic coprocessor as a chip manufactured with current, conventional semiconductor technology may surpass $10^{15}$ operations/second. This chip may perform this large amount of processing for two reasons: (1) the computations are simple because they mimic the simple operations of a synapse, as opposed, for example, to the much more intensive computational operations of multiplying 64-bit floating bit numbers; and (2) the nature of elastic representation VLDWs facilitates processing large amounts of data in parallel. Current processing chips, such as more conventional CPU's, often have many computing cores to increase the processing power, but partitioning the data and algorithms across those cores is difficult, and for some algorithms, impossible. The challenge of partitioning the processing load across a multitude of processing elements is a barrier to achieving ever higher processing throughput. This is not the case with elastic representation VLDWs, which provide a more simple solution to the challenge of massively parallel processing. Possible applications relevant to the synaptic coprocessor 100 include:

Robotics—Equipping industrial and humanoid robots with AGI will greatly extend the range of services they can offer.

Autonomous vehicles—From underwater to space-borne, on land, in the air, and on the sea surface, autonomous vehicles are expanding at a breathtaking pace. Today's AI technology offers unreliable control of these vehicles and there are often too many vehicles ("swarms" of autonomous vehicles) for humans to control. AGI is often the only viable solution.

Knowledge Assistants—Expert technical assistance for almost any technical discipline from medicine to finance and science to construction.

Interactive Toys—Imagine today's toys with sensors that are augmented to provide a warm and fun response to interactions with children.

Cybersecurity—AGI offers a robust approach to rapidly assessing the intent and appropriate remediation in the presence of a flood of low-level indications and warnings.

Anomaly Detection—Financial fraud in an audit, corporate, or banking environment, insurance fraud, manufacturing defects, and code defects.

Cognitive Warfare—Everything from cognitive radios to cognitive electronic warfare (EW), cognitive sensors to cognitive battlefield management.

The synaptic coprocessor 100 may use the very long data words in sparse matrix techniques similar to a super position of smaller words and some data representations. In an example, each bit may be conceptionally analogous to a synapse of a human brain. The synaptic coprocessor 100 as a chip may interface with the outside world as if it includes a 64-bit interface, but internally operate with very long data words. Because processing pipelines 130 are used, the calculations may be accomplished in a clock cycle, and in an example, compute a Boolean inner product between a search term and test VLDW at a latency to obtain the results after multiple clocks. It can be clocked at a DMA rate and it is not based on floating point or those types of standard computer representations.

In the very long data words used with the synaptic coprocessor 100, the bits have values of one and the coprocessor may use a type of unary arithmetic. This is in comparison to more conventional graphic processing units that use massive amounts of parallel floating point operations. The synaptic coprocessor 100 may operate similar to dot-product engines, resulting in a measure of similarity of two words, such as two very long data words. It is possible to obtain a threshold instead of the synaptic coprocessor 100 inspecting every dot-product result. There may be a million word buffer, but if only 8 "hits" are above the threshold, those may be processed further with the address to which each of those 8 "hits" came, indicating the match for that vector.

In an example, each processing pipeline 130 includes an adder tree organized as a processing pipeline such as with a series of summers. The synaptic coprocessor 100 may be packaged as a single chip in this example because of the challenges associated with breaking up and the fan out of the very long data words. The adder tree may include logic that replicates thousands of parallel lines for a very long data word, such as a 1 million bit wide word. The 1's and 0's may be in a linear matrix for vector processing such as in vector processing unit 138. A histogram could be the result of a partial summation and taking the adder tree and tapping it off at a higher level. It may be possible to have some ordering of the summation results on chip or off chip and have serial Boolean and logic circuits.

There now follows a description of techniques for generating the elastic representation VLDWs that represent very long data words. In a concept, it may be understood that "neurons that fire together are wired together." Each idea or mental concept is represented by a small population of neurons that wire themselves together via new synaptic connections into a set of neurons that behave as a "locked" set. When most of the neurons become active, the entire set becomes active. This strategy in the past has been called "voting" logic, where all neurons in the set vote the same way. The concept of an engram is represented by the entire set. An individual neuron may convey no meaning. Each neuron in the set may also be a member of thousands of other sets. With 1 million neurons simulated, and 32 neurons in the set that includes one mental concept, the number of unique concepts that can be represented is nearly infinite. For example, 1,000,00032 is equal to about 10192 unique combinations. To be useful, there should be some separation between concepts corresponding to the Hamming distance, so the number of useful representations may be less than 10192. Calculating the number of useful representations may depend on design parameters.

For example, referring to the dot design of 680 showing a linear array of nodes in FIG. 18A, the filled-in nodes may represent the neurons that have been wired together to represent a mental concept as an engram. There may be different layers of elastic representation VLDWs.

Referring now to FIG. 18B and the parallel linear array of nodes at 684, there are examples of elastic representation VLDWs to convey the size of an animal. The examples use 6 out of 32 nodes in the representation, but a more realistic example may use 32 out of 64,000 nodes. The first example in the first line shows an example elastic representation VLDW for "medium size" and the second example on the second line shows the example elastic representation VLDW for "smaller than medium size." The third example on the third line shows the example elastic representation VLDW for "larger than medium size" and the last example on the last line shows the example elastic representation VLDW for a "much larger than medium size."

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A coprocessor, comprising:
   a memory configured to store a plurality of Very Long Data Words, each comprising a test Very Long Data Word (VLDW) having a length in the range of about one thousand bits to one million or more bits and containing encoded information that is distributed across the length of the VLDW;
   a processor configured to generate search terms; and
   a processing logic unit configured to:
   receive a test VLDW from the memory;
   receive a search term from the processor; and
   compute a Boolean inner product between the search term and the test VLDW read from memory indicative of the measure of similarity between the test VLDW and the search term, wherein the processing logic unit comprises one or more pipeline Boolean logic circuits that compute the Boolean inner product.

2. The coprocessor of claim 1, further comprising a buffer configured to store the Boolean inner products resulting from the computation between each search term and the test VLDW together with the address in memory from which the test VLDW was read.

3. The coprocessor of claim 1, further comprising a Direct Memory Access (DMA) controller connected to the processor and memory and configured to address and control the transfer of test VLDWs from memory to the processing logic unit.

4. The coprocessor of claim 1, wherein said processor includes a conventional CPU interface for communicating with external devices, wherein said processor is configured to receive VLDWs as a plurality of 64-bit words via the conventional CPU interface and reformat the 64-bit words into a test VLDW having a length of about one thousand bits to at least one million bits.

5. The coprocessor of claim 1, comprising an external sensor connected to the coprocessor and configured to generate sensor data, said processor is configured to receive the sensor data and generate a sensed data VLDW from the sensor data, wherein said processing logic unit is configured to compare the sensed data VLDW to a search term.

6. The coprocessor of claim 1, wherein said processor is configured to generate a plurality of test VLDWs, and said processing logic unit includes a processing buffer into which the plurality of test VLDWs are buffered.

7. The coprocessor of claim 1, wherein said processor includes a serial interface and digital logic, wherein said serial interface passes serial data to said digital logic to reformat the serial data into very long data words.

8. A coprocessor, comprising:
a memory configured to store a plurality of Very Long Data Words, each comprising a test Very Long Data Word (VLDW) having a length in the range of about one thousand bits to one million or more bits and containing encoded information that is distributed across the length of the VLDW;
a processor configured to generate search terms; and
a processing logic unit configured to:
receive a test VLDW from the memory;
receive a search term from the processor; and
compute a Boolean inner product between the search term and the test VLDW read from memory indicative of the measure of similarity between the test VLDW and the search term, wherein the processor is configured to perform calculations at a clock rate and compute a Boolean inner product between the search term and the test VLDW at a latency to obtain results after multiple clocks.

9. The coprocessor of claim 8, further comprising a buffer configured to store the Boolean inner products resulting from the computation between each search term and the test VLDW together with the address in memory from which the test VLDW was read.

10. The coprocessor of claim 8, further comprising a Direct Memory Access (DMA) controller connected to the processor and memory and configured to address and control the transfer of test VLDWs from memory to the processing logic unit.

11. The coprocessor of claim 8, wherein said processor includes a conventional CPU interface for communicating with external devices, wherein said processor is configured to receive VLDWs as a plurality of 64-bit words via the conventional CPU interface and reformat the 64-bit words into a test VLDW having a length of about one thousand bits to at least one million bits.

12. The coprocessor of claim 8, comprising an external sensor connected to the coprocessor and configured to generate sensor data, said processor is configured to receive the sensor data and generate a sensed data VLDW from the sensor data, wherein said processing logic unit is configured to compare the sensed data VLDW to a search term.

13. The coprocessor of claim 8, wherein said processor is configured to generate a plurality of test VLDWs, and said processing logic unit includes a processing buffer into which the plurality of test VLDWs are buffered.

14. The coprocessor of claim 8, wherein said processor includes a serial interface and digital logic, wherein said serial interface passes serial data to said digital logic to reformat the serial data into very long data words.

15. A coprocessor, comprising:
a memory configured to store a plurality of Very Long Data Words, each comprising a test Very Long Data Word (VLDW) having a length in the range of about one thousand bits to one million or more bits and containing encoded information that is distributed across the length of the VLDW;
a processor configured to generate search terms; and
a processing logic unit configured to:
receive a test VLDW from the memory;
receive a search term from the processor; and
compute a Boolean inner product between the search term and the test VLDW read from memory indicative of the measure of similarity between the test VLDW and the search term, wherein the processing logic unit is configured to operate on successive test VLDWs compared against a search term.

16. The coprocessor of claim 15, further comprising a buffer configured to store the Boolean inner products resulting from the computation between each search term and the test VLDW together with the address in memory from which the test VLDW was read.

17. The coprocessor of claim 15, further comprising a Direct Memory Access (DMA) controller connected to the processor and memory and configured to address and control the transfer of test VLDWs from memory to the processing logic unit.

18. The coprocessor of claim 15, wherein said processor includes a conventional CPU interface for communicating with external devices, wherein said processor is configured to receive VLDWs as a plurality of 64-bit words via the conventional CPU interface and reformat the 64-bit words into a test VLDW having a length of about one thousand bits to at least one million bits.

19. The coprocessor of claim 15, comprising an external sensor connected to the coprocessor and configured to generate sensor data, said processor is configured to receive the sensor data and generate a sensed data VLDW from the sensor data, wherein said processing logic unit is configured to compare the sensed data VLDW to a search term.

20. The coprocessor of claim 15, wherein said processor is configured to generate a plurality of test VLDWs, and said processing logic unit includes a processing buffer into which the plurality of test VLDWs are buffered.

* * * * *